(12) United States Patent
Zhang et al.

(10) Patent No.: US 8,184,002 B2
(45) Date of Patent: May 22, 2012

(54) METHOD AND DEVICE FOR RECEIVING EMERGENCY EVENT ALERT

(75) Inventors: Dewen Zhang, Shenzhen (CN); Youzhu Shi, Shenzhen (CN); Ni Zhang, Shenzhen (CN); Lingzhi Mao, Shenzhen (CN); Zhongbao Zhang, Shenzhen (CN); Baojian Qi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 385 days.

(21) Appl. No.: 12/502,320

(22) Filed: Jul. 14, 2009

(65) Prior Publication Data
US 2010/0019899 A1  Jan. 28, 2010

(30) Foreign Application Priority Data

Jul. 28, 2008  (CN) .................... 2008 1 0134570
Apr. 13, 2009  (WO) ............... PCT/CN2009/071245

(51) Int. Cl.
*G08B 21/00* (2006.01)
(52) U.S. Cl. ........... 340/540; 340/905; 725/33; 725/108
(58) Field of Classification Search ............... 340/540, 340/531, 905; 709/238, 200, 206, 217, 218; 455/404.1; 725/33, 133, 34, 35, 46, 141, 725/153, 105, 108, 110; 348/473, E07.024, 348/E05.096
See application file for complete search history.

(56) References Cited

U.S. PATENT DOCUMENTS

| | | | |
|---|---|---|---|
| 6,177,873 B1 * | 1/2001 | Cragun ...................... 340/601 |
| 6,543,051 B1 * | 4/2003 | Manson et al. ................ 725/33 |
| 6,816,878 B1 * | 11/2004 | Zimmers et al. .............. 709/200 |
| 6,882,709 B1 | 4/2005 | Sherlock et al. |
| 7,159,230 B2 * | 1/2007 | Manson et al. ................ 725/33 |
| 7,592,912 B2 * | 9/2009 | Hasek et al. ............. 340/539.16 |
| 7,793,320 B2 * | 9/2010 | Yun et al. ....................... 725/33 |
| 2005/0183120 A1 | 8/2005 | Jain et al. |

(Continued)

FOREIGN PATENT DOCUMENTS

CN  101175198 A  5/2008

(Continued)

OTHER PUBLICATIONS

International Search Report and Written Opinion issued in corresponding PCT Patent Application No. PCT/CN2009/071245, mailed Jul. 23, 2009.

(Continued)

*Primary Examiner* — Toan N Pham
(74) *Attorney, Agent, or Firm* — Brinks Hofer Gilson & Lione

(57) ABSTRACT

A method, a device, and a system for receiving an emergency event alert are provided, which relate to a field of communication applications. As long as communication between a user terminal and a bearer network is normal, no matter whether the user terminal is watching live television programs, the user terminal can receive the emergency event alert in time. The method is as follows. A receiving unit discovers an emergency event alert service. The receiving unit is attached to the emergency event alert service. The receiving unit receives an emergency event alert message sent by a distributing unit. An emergency event alert receiving unit device includes a discovering and processing module, a service attachment processing module, and a message reception processing module. Through attachment to the emergency event alert service, the user terminal can receive the emergency event alert in time.

16 Claims, 12 Drawing Sheets

U.S. PATENT DOCUMENTS

| | | |
|---|---|---|
| 2007/0101473 A1 | 5/2007 | Henderson |
| 2007/0136743 A1 | 6/2007 | Hasek et al. |
| 2008/0120639 A1 | 5/2008 | Walter et al. |
| 2009/0031340 A1* | 1/2009 | Modi et al. .................. 725/33 |
| 2009/0228915 A1* | 9/2009 | Luu et al. .................... 725/33 |

FOREIGN PATENT DOCUMENTS

| | | |
|---|---|---|
| CN | 101222283 A | 7/2008 |
| CN | 101640573 A | 9/2011 |
| WO | WO 2007/101473 A1 | 9/2007 |

OTHER PUBLICATIONS

Office Action issued in corresponding Chinese Patent Application No. 201110036793.9, mailed Nov. 17, 2011.

* cited by examiner

METHOD AND DEVICE FOR RECEIVING EMERGENCY EVENT ALERT

CROSS-REFERENCE TO RELATED APPLICATIONS

This application claims priority to Chinese Patent Application No. 200810134570.4, filed on Jul. 28, 2008, and International Application No. PCT/CN2009/071245, filed on Apr. 13, 2009, both of which are incorporated herein by reference in their entireties.

FIELD OF THE TECHNOLOGY

The present invention relates to the field of communication applications, and more particularly to a method, a device, and a system for receiving an emergency event alert.

BACKGROUND

The IP multimedia subsystem (IMS) is a new multimedia service defined in the 3rd Generation Partnership Project (3GPP) standards. The IMS meets the requirements for more novel and diverse multimedia services of end users nowadays. The IMS is a target network for a 3rd Generation (3G) mobile network to implement packet voice and packet data, and to provide uniform multimedia services and applications.

The IMS adopts an IP packet switched domain as a bearer channel for its control signaling and media transmission, and uses the Session Initiation Protocol (SIP) for call control signaling, so as to realize the separation of service management, session control and bearer access.

The Internet Protocol Television (IPTV) service is a new technology for providing various interactive services, including digital television for family users by using a broadband IP network, which combines various technologies such as Internet, multimedia, and communication. A user may use the IPTV service at home through a PC or a network set-top box plus a common television set, or may use the IPTV service through a mobile terminal. The IPTV uses a TCP/IP as the bearer protocol for unicast, broadcast or multicast of video services, so that three fields of television network, telephone network, and Internet are integrated effectively. Therefore, the IPTV is the most representative service of three-network convergence, which is attracting more and more attention from the industry.

The IMS based IPTV (IPTV based on the IMS) is to provide an IPTV service in an integral architecture of the IMS, so as to make full use of existing mechanisms for registration, authentication, routing, session control and establishment, service triggering, accounting, and end-to-end quality of service (QoS) assurance in an IMS network to provide streaming media services, as well as multimedia services that integrate streaming media and real-time session service for users.

The emergency alert system (EAS) releases an emergency event alert message to the public timely and accurately, for example, emergency messages about events threatening lives and properties including meteorological disasters, geologic hazards, toxic gas leakage, tsunami early warnings, earthquake early warnings, commotions, wars, and the like. For the IMS network and the IMS based IPTV system, a proper mechanism is required to release an emergency event alert to end users in time. The forms of the emergency event alert message may include text, audio, and video.

In the EAS service of conventional television, an emergency event alert message is transferred by changing content sources. That is, the emergency event alert message is transferred by switching content sources at a network side. For example, broadcast of current program content is suspended by a local television station, and the emergency event alert message is inserted. A user that watches the channel may then receive the emergency event alert message. However, if the channel that the user is watching has not broadcasted the emergency event alert message, the user cannot receive the emergency event alert in time. For example, a user is watching programs on a non-local television channel or even a foreign television channel while the local government department releases the emergency event alert message through the local television channel, so the user is unable to receive the message in time. Moreover, even if content sources of all channels transmitted to a local user are switched to the emergency event alert message at a local television relay station, still only users who are watching live television programs can receive the emergency event alert message. In the interactive IPTV, a user terminal is not only able to watch live television programs, but also is able to watch video on demand (VOD) programs, or operate an electronic program guide menu (EPG menu), play games, and the like, or even perform completely local operations such as watch locally saved programs, or perform video calling. In this way, these user terminals that are performing other operations instead of watching television programs at that time are unable to watch the emergency event alert message.

In the process for implementing the present invention, the inventors discovered at least the following problem in the prior art: the users who are not watching live television programs are unable to receive an emergency event alert in time.

SUMMARY

The present invention provides a method, a device, and a system for receiving an emergency event alert. As long as communication between a user terminal and a bearer network is normal, the user terminal can receive the emergency event alert in time, no matter whether the user terminal is watching live television programs.

An embodiment of the present invention is implemented through the following technical solution.

A method for receiving an emergency event alert is provided. The method includes the following steps.

A receiving unit discovers an emergency event alert service.

The receiving unit attaches to the emergency event alert service.

The receiving unit receives an emergency event alert message sent by a distributing unit.

An emergency event alert receiving unit device is provided. The emergency event alert receiving unit device includes a discovering and processing module, a service attachment processing module, a message reception processing module, and a media stream reception processing module.

The discovering and processing module is configured to discover an emergency event alert service.

The service attachment processing module is configured to perform attachment of the emergency event alert service after the emergency event alert service is found.

The message reception processing module is configured to receive an emergency event alert message and obtain an emergency event alert indication from the emergency event alert message.

The media stream reception processing module is configured to receive an emergency event alert media stream and switch to present the emergency event alert media stream according to the obtained emergency event alert indication.

A server device for an emergency event alert service is provided. The emergency event alert service server device includes a release interface module, a message distribution module, and a media stream control module.

The release interface module is configured to receive an emergency event alert message and obtain an emergency event alert indication from the emergency event alert message.

The message distribution module is configured to distribute the emergency event alert message.

The media stream control module is configured to control a media server (MS) to receive and distribute an emergency event alert media stream according to the emergency event alert indication.

An emergency-call session control function (E-CSCF) device is provided. The E-CSCF device includes an emergency channel joining identification module and an emergency channel joining processing module.

The emergency channel joining identification module is configured to identify that an emergency event alert session establishment request is an emergency channel joining request message by identifying that an IPTV channel identity carried in the emergency event alert session establishment request is an emergency channel identity, or by identifying an emergency indication message carried in the session establishment request.

The emergency channel joining processing module is configured to request a policy enforcement entity in a bearer layer to reserve a bearer resource after the emergency channel joining request message is identified, and to contain a priority of the bearer resource to be reserved according to the identified IPTV channel identity or emergency indication.

A system for receiving an emergency event alert is provided. The system includes a distributing unit and a receiving unit.

The distributing unit is configured to send an emergency event alert message to the receiving unit.

The receiving unit is configured to discover an emergency event alert service, attach to the emergency event alert service, and receive the emergency event alert message sent by the distributing unit.

In an embodiment, the present invention further provides a method for discovering an emergency event alert service, which discovers the emergency event alert service through third-party registration. The embodiment of the present invention is implemented through the following technical solution.

A receiving unit sends an IMS registration request to a call session control function (CSCF).

After the CSCF processes the IMS registration request, a third-party IMS registration request is sent to an emergency alert system application server (EAS AS).

After processing the third-party IMS registration request, the EAS AS sends an emergency event alert service found message to the receiving unit.

In an embodiment, the present invention further provides a method for receiving an emergency event alert media stream, which assures network bandwidth resources required for transmitting the media stream. The embodiment of the present invention is implemented through the following technical solution.

A network parameter of the emergency event alert media stream is obtained from an emergency event alert message. The network parameter includes multicast address information. The multicast address information is a specific dedicated multicast address, or a common multicast address.

A request message for joining a multicast group corresponding to the multicast address information is sent. The request message contains the multicast address information, or contains an emergency indication at the same time.

A multicast elementary control function/elementary forwarding function (ECF/EFF) processes the request message for joining the multicast group, requests a resource and admission control subsystem (RACS) to reserve a bearer resource, and contains a priority of the bearer resource to be reserved according to the identified multicast address or emergency indication.

The multicast group is joined, and the emergency event alert media stream is received, played and output.

In an embodiment, the present invention further provides a method for joining an emergency event alert IPTV channel, which performs forced switching of the emergency event alert channel. The embodiment of the present invention is implemented through the following technical solution.

An IPTV channel identity of the emergency event alert is obtained from an emergency event alert message. The IPTV channel identity is a specific dedicated channel identity for sending the emergency event alert media stream or a common channel identity.

An emergency event alert session establishment request is initiated. The establishment request contains the IPTV channel identity, or contains an emergency indication at the same time.

An emergency-call session control function (E-CSCF) processes the emergency event alert session establishment request, requests a resource and admission control subsystem (RACS) to reserve a bearer resource, and contains a priority of the bearer resource to be reserved according to the identified IPTV channel identity or emergency indication.

After an emergency event alert session is established, the emergency event alert IPTV channel is joined.

As can be seen from the technical solutions above, after a receiving unit discovers an emergency event alert service, the receiving unit attaches to the emergency event alert service and receives an emergency event alert message sent by a distributing unit. Therefore, no matter whether a user terminal is watching live television programs, as long as communication between the user terminal and a bearer network is normal, the user terminal can receive the emergency event alert in time.

Furthermore, by providing a bandwidth policy of an emergency event alert service, a terminal of an IMS network can receive an emergency event alert in time, no matter what program the terminal is enjoying, for example, watching IPTV programs or playing games, or watching programs locally saved in the terminal, or performing menu operations, and no matter what communication is being performed, for example, a video calling. Also, the emergency event alert service can be provided in the case of service abnormalities, and as long as a user is successfully registered with the IMS network, the user can receive the emergency event alert service. Even in the case that the user terminal is not successfully registered with the IMS network, or that the IMS network registration fails, or that roaming is restricted, as long as communication between the terminal and the bearer network is normal, the terminal can receive the emergency event alert service.

DETAILED DESCRIPTION

Figure 1:
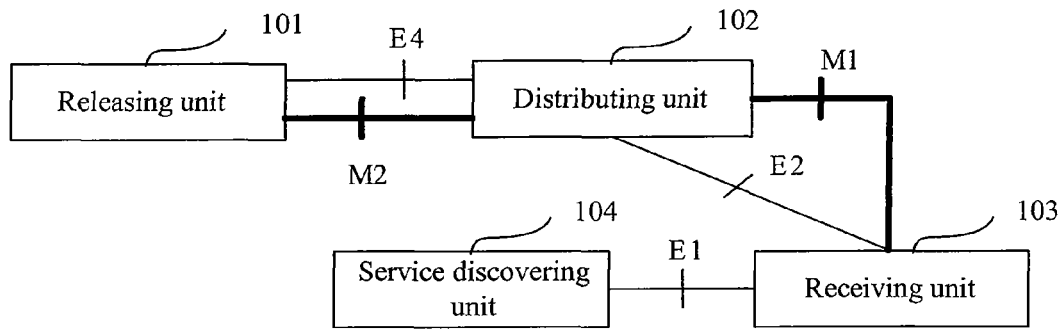
FIG. 1 is a logical architecture diagram of an applicable network according to an embodiment of the present invention.

FIG. 1 is a logical architecture diagram of an applicable network according to an embodiment of the present invention. As shown in FIG. 1, the network includes a releasing unit 101, a distributing unit 102, a receiving unit 103, and a service discovering unit 104.

1) The releasing unit 101 is configured to release an emergency event alert. As an emergency event alert source, the releasing unit 101 releases the emergency event alert to the distributing unit 102.

The releasing unit 101 is usually located in an EAS center of a government department at different levels. The releasing unit 101 is usually an apparatus outside an IMS network. An interface exists between the releasing unit 101 and the IMS network. The interface protocol is usually specified by a government department.

An E4 interface between the releasing unit 101 and the distributing unit 102 is a signaling interface, which is configured to perform signaling exchange and control for emergency event alert releasing, and send an emergency event alert message. For example, through the E4 interface, the releasing unit 101 requests the distributing unit 102 to release the emergency event alert. The distributing unit 102 authenticates the releasing unit 101. The emergency event alert message sent through the E4 interface contains an emergency event alert indication (including an address of an emergency event alert media stream), indicating how a receiver of the message obtains media content of the emergency event alert. The content of the emergency event alert in a text form and the like may also be transmitted through the E4 interface. The E4 interface protocol is specified by the government department, which may be a dedicated protocol, the SIP, the HTTP, and other standard protocols or private protocols.

An M2 interface between the releasing unit 101 and the distributing unit 102 is a media stream interface, which is configured to transmit the emergency event alert in an audio-video form, for example, an audio-video media stream or an audio-video file. The interface protocol includes, but is not limited to, the RTP/RTCP, the FTP, the HTTP, and other standard protocols or private protocols.

2) The distributing unit 102 is configured to distribute the emergency event alert to the receiving unit 103. After the emergency event alert from the releasing unit 101 is received, the emergency event alert is distributed to the receiving unit 103.

The distributing unit 102 not only distributes the emergency event alert message at a signaling level, but also delivers the emergency event alert at a media level, that is, distributes the emergency event alert content in the form of the audio-video media stream.

In the IMS network, the distributing unit 102 may be located in an application server (AS), a media server (MS), or an elementary control function/elementary forwarding function (ECF/EFF) single entity of multicast forwarding of a multicast service. The distributing unit 102 may also be located in the AS and the ECF/EFF, or in multiple entities such as the AS, the MS and the ECF/EFF.

The distributing unit 102 may also be a network instead of an entity or several entities, that is, one network for distributing the emergency event alert. In the network, a part of entities have direct interfaces with the releasing unit 101, another part of entities have direct interfaces with the receiving unit 103, and still another part of entities do not have direct interfaces with the releasing unit 101 or the receiving unit 103, so that a service distribution function is implemented in the network. For example, in the IMS network, an IMS core including a P-CSCF, an S-CSCF, an I-CSCF may serve as a network for distributing the emergency event alert, which routes and distributes the emergency event alert message, and distributes the emergency event alert message to a user equipment (UE) serving as the emergency event alert receiving unit 103 finally. The IMS core performs distribution of the emergency event alert at the signaling level, and the media network controlled by the IMS performs distribution of the emergency event alert at the media level.

3) The receiving unit 103 is configured to attach to the distributing unit 102 to receive the emergency event alert distributed by the distributing unit 102, and to perform processing and presentation of the emergency event alert.

In the IMS network, the receiving unit 103 may be located in the UE.

An E2 interface between the receiving unit 103 and the distributing unit 102 is a signaling interface, which is configured to perform signaling exchange and control of the emergency event alert, and send the emergency event alert message, for example, to transmit the emergency event alert indication, to transmit the emergency event alert in a text form, and the like. The interface protocol includes, but is not limited to, dedicated protocols over IP, SIP, other standard protocols or private protocols.

An M1 interface between the receiving unit 103 and the distributing unit 102 is a media stream interface, which is configured to transmit the emergency event alert in an audio-video form, for example, an audio-video media stream or an audio-video file. The interface protocol includes, but is not limited to, the RTP/RTCP, the FTP, the HTTP, and other standard protocols or private protocols.

The M1 interface is not compulsory in a specific process for sending the emergency event alert. For example, when content of the emergency event alert message is in a text form, the content in the text form may be directly transmitted on the E2 interface.

Usually, according to the emergency event alert indication transmitted on the E2 interface, the M1 interface instructs the receiving unit 103 to obtain the emergency event alert in the audio-video form from the M1 interface, in which the emergency event alert indication contains parameters related to the M1 interface, for example, address information, media format information, or an identity of an IPTV channel for sending the emergency event alert. The receiving unit 103 receives the content of the emergency event alert in the audio-video form from the M1 interface according to the indication, and plays and outputs the content.

4) The service discovering unit 104 is configured to discover an emergency event alert service, that is, obtain information related to the distributing unit 102, so that the receiving unit 103 can attach to the distributing unit 102 to receive the emergency event alert.

In the IMS network, the service discovering unit 104 may be located in a Network Attachment Subsystem (NASS), a Gateway GPRS Support Node (GGSN), a CSCF, an AS, or a Dynamic Host Configuration Protocol (DHCP) server, and may also be located in the UE.

An E1 interface between the service discovering unit 104 and the receiving unit 103 is a direct interface or an indirect interface, which is configured to transmit emergency event alert service discovering information, for example, to transmit address information of the distributing unit 102 to the receiving unit 103. The interface protocol includes, but is not limited to, the DHCP, the DIAMETER protocol, the SIP, and other standard protocols or private protocols.

The service discovering unit 104 and the receiving unit 103 may be located in the same physical entity, for example, in the UE. In this case, the E1 interface between the service discovering unit 104 and the receiving unit 103 is an internal interface.

In view of the above, a complete emergency event alert may be as follows:

A. The emergency event alert only includes the emergency event alert message transmitted on the E2 interface. The emergency event alert message may contain content of an emergency event alert message with fewer bytes that can be easily carried in a message body, for example, the content of the emergency event alert message in a text form. In this case, the M1 interface is not used.

B. The emergency event alert includes two parts. One part is the emergency event alert message transmitted on the E2 interface, and the alert message contains the emergency event alert indication. The other part is an emergency event alert media stream transmitted on the M1 interface. In this case, the emergency event alert message transmitted on the E2 interface contains the emergency event alert indication, and the emergency event alert indication contains the parameters related to the M1 interface, which are configured to instruct the receiving unit 103 to obtain an emergency event alert in an audio-video form from the M1 interface.

Figure 2:
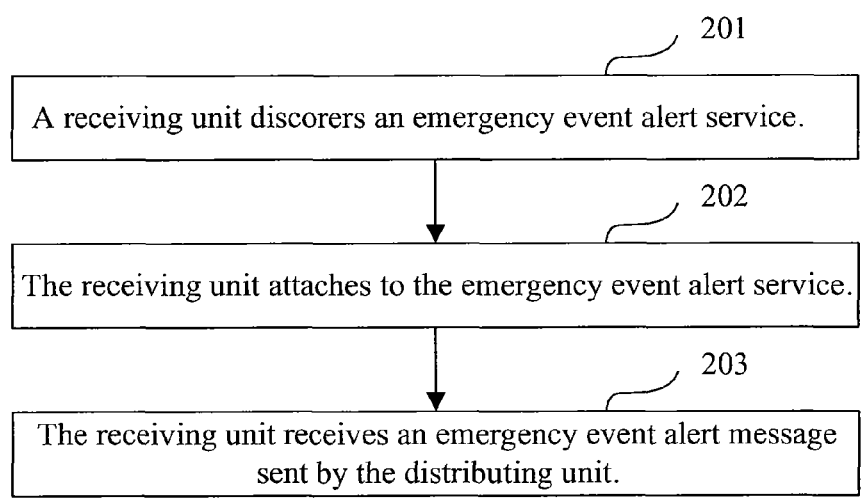
FIG. 2 is a flow chart of a method for receiving an emergency event alert according to an embodiment of the present invention.

FIG. 2 is a flow chart of a method for receiving an emergency event alert according to an embodiment of the present invention. The method includes the following steps.

In Step 201, a receiving unit discovers an emergency event alert service.

The receiving unit discovers the emergency event alert service. That is, the receiving unit discovers a distributing unit, that is, the receiving unit obtains information related to the emergency event alert distributing unit, including address information related to the distributing unit or some parameter information. In an embodiment of the present invention, the emergency event alert message is sent in a multicast manner. The information related to the distributing unit to be obtained includes multicast address information for the distributing unit to send the emergency event alert, or indirect database server address information of the distributing unit. The receiving unit uses the information related to the distributing unit to receive the emergency event alert message.

If the information related to the distributing unit obtained by the receiving unit is indirect information, for example, an address of a database server, the receiving unit first obtains the indirect information, and then obtains the direct information of the distributing unit. For example, address information of the database server is first obtained, and then the multicast address information of the distributing unit is obtained from the database server.

The receiving unit may discover the distributing unit as follows: the information related to the distributing unit is preset on a receiving unit physical entity, or message exchange is performed between the receiving unit and a service discovering unit to obtain the information related to the distributing unit. The former is a static discovering process, that is, a static data configuration and obtaining process on the receiving unit physical entity. The latter is a dynamic discovering process, for example, in a process of network attachment or after the network attachment is completed, or in a process of IIMS registration or after the IMS registration is completed, the distributing unit is found dynamically.

The static discovering process is to statically preset the information related to the distributing unit, for example, the multicast address information for the distributing unit to send the emergency event alert or indirect database server address information, on the receiving unit physical entity. Such information may be set by a user, or may be preset before the terminal is delivered to the user. For example, if the multicast address of the transmitted emergency event alert message is a well known multicast address specified by the industry standard, the multicast address can be preset in the terminal apparatus. For the static service discovering process, the discovering unit and the receiving unit are located within the same physical entity. The service discovering unit provides a user input interface or other input interfaces to receive settings of the information of the distributing unit. The E1 interface between the receiving unit and the service discovering unit is an internal interface within a physical entity, for example, a data query interface. The receiving unit uses the internal interface to obtain the information of the distributing unit, and completes the discovering of the emergency event alert service.

The dynamic discovering process is to perform message exchange with the service discovering unit through the E1 interface in a startup process of the receiving unit, so as to obtain the information related to the distributing unit. Here, the message exchange is performed in a PULL manner or a PUSH manner. In the PULL manner, the receiving unit sends an emergency event alert service discovering request message to the service discovering unit through the E1 interface, the service discovering unit sends an emergency event alert service discovering response message to the receiving unit through the E1 interface, and the response message contains the information related to the distributing unit, for example, the multicast address for sending the emergency event alert message. In the PUSH manner, the service discovering unit sends an emergency event alert service discovering indication message to the receiving unit through the E1 interface, and the message contains the information related to the distributing unit.

In the IMS network, the locations of the service discovering unit may be as follows: the service discovering unit is located in a bearer layer, and is one entity or multiple entities in a bearer network; or the service discovering unit is located in a service layer, and is one entity or multiple entities in a session layer or an application layer in the IMS network, in which entities in the bearer layer may also be included.

Correspondingly, in the service discovering process in the PULL manner, the receiving unit may send the emergency event alert service discovering request message as follows: the request is sent in the bearer network, for example, in the network attachment process or after the network attachment; alternatively, the request is sent in the service layer, for example, in the IMS registration process or after the IMS registration. That is, the sending of the emergency event alert service discovering request message by the receiving unit is a service discovering process in the PULL manner at a bearer network level (which may be subdivided into a service discovering process in the PULL manner in a network attachment process and a service discovering process in the PULL manner after the network attachment) or a service discovering process in the PULL manner at an IMS level (which may be subdivided into a service discovering process in the PULL manner in an IMS registration process and a service discovering process in a PULL manner after the IMS registration).

The service discovering process in the PULL manner in the network attachment process means that the receiving unit sends the emergency event alert service discovering request in the network attachment process to obtain the information of the distributing unit, so that the service discovering process is completed while the network attachment process is completed. A general network attachment process is as follows: the receiving unit sends a network attachment request, for example, a dynamic host configuration protocol (DHCP) request, to the network; the request may be sent in a broadcast manner; an entity for processing the network attachment request in the network, for example, a DHCP server, receives the network attachment request; in addition to performing normal processing of the network attachment request, the entity for processing the network attachment request in the network further obtains the information related to the distributing unit, for example, multicast address information for sending the emergency event alert message; the network attachment response message sent to the receiving unit contains the information of the distributing unit. In this way, the receiving unit completes the discovering of the emergency event alert service while it completes the network attachment. In this process, the service discovering unit is located in the entity that processes the network attachment request in the network, for example in the DHCP server. The emergency event alert service discovering request is in the network attachment request message. The emergency event alert service discovering request may be an implicit request, that is, the network attachment request sent by the receiving unit does not contain the emergency event alert service discovering request explicitly. The entity that processes the network attachment request additionally processes the emergency event alert service discovering request, and the network attachment response message contains the emergency event alert service discovering information. The emergency event alert service discovering request may also be an explicit request, that is, the network attachment request message contains the emergency event alert service discovering request indication explicitly.

Therefore, for the discovering of the emergency event alert service in the PULL manner in the process of the network attachment, the emergency event alert service discovering request is carried in the network attachment request message, and the emergency event alert service discovering response is carried in the network attachment response message.

The service discovering process in the PULL manner after the network attachment means that the receiving unit sends the emergency event alert service discovering request after the network attachment is completed to obtain the emergency event alert service discovering information, and the discovering process of the emergency event alert service is completed after the network attachment process. For example, after the network attachment is completed, the receiving unit sends the emergency event alert service discovering request to the network. The request may be sent in a broadcast manner. An entity for processing the emergency event alert service discovering in the network (that is, the service discovering unit) processes the service discovering request, and returns the emergency event alert service discovering response message. The response message contains the emergency event alert service discovering information. In this process, the service discovering unit may be located in an independent entity different from the entity for processing the network attachment.

The service discovering process in the PULL manner in the process of the IMS registration means that the receiving unit sends the emergency event alert service discovering request in the process of the IMS registration to obtain the information related to the distributing unit, so that the process of the service discovering is completed while the IMS registration is completed. A general IMS registration is as follows: the receiving unit sends an IMS registration request message (an SIP Register message) to the proxy-call state control function (P-CSCF) after a P-CSCF address is obtained; the IMS registration request is routed to an assigned S-CSCF, and the IMS registration is then performed; the serving-CXCF (S-CSCF) returns an IMS registration response message (an SIP respond code message) to the receiving unit. The entity that processes the IMS registration, for example, the S-CSCF, receives the IMS registration request. In addition to performing normal processing of the IMS registration request, the entity that processes the IMS registration obtains the information related to the distributing unit, for example, the information of the multicast address for sending an emergency event alert message; the IMS registration response message sent to the receiving unit contains the emergency event alert service discovering information. In this way, the receiving unit obtains the emergency event alert service discovering information while it completes the IMS registration. In this process, the service discovering unit is located in the entity that processes the IMS registration request in the IMS network, for example, in the S-CSCF. The emergency event alert service discovering request is carried in the IMS registration request message. The emergency event alert service discovering request may be an implicit request, that is, the IMS registration request sent by the receiving unit does not contain the emergency event alert service discovering request explicitly. The entity that processes the IMS registration request additionally processes the emergency event alert service discovering, and the IMS registration response message contains the emergency event alert service discovering information. The emergency event alert service discovering request may also be an explicit request, that is, the IMS registration request message contains the emergency event alert service discovering request indication explicitly.

Thus, for the emergency event alert service discovering in the PULL manner in the process of the IMS registration, the emergency event alert service discovering request is carried in the IMS registration request message, and the emergency event alert service discovering response is carried in the IMS registration response message.

The service discovering process in the PULL manner after the IMS registration means that the receiving unit sends the emergency event alert service discovering request after the IMS registration is completed to obtain the emergency event alert service discovering information, and the emergency event alert service discovering process is completed after the IMS registration process. For example, after the IMS registration is completed, the receiving unit sends the emergency event alert service discovering request to the network. The request may be sent to the S-CSCF. The S-CSCF triggers the request to the entity that processes the emergency event alert service discovering (that is, the service discovering unit), for example, an application server (AS) to process the service discovering request, according to a certain policy, for example, an initial filter criteria (iFC). The AS returns the emergency event alert service discovering response message. The message contains the emergency event alert service discovering information. The emergency event alert service discovering response message is sent to the receiving unit through the S-CSCF.

The emergency event alert service discovering in the PUSH manner is to send an emergency event alert service discovering indication message to the receiving unit after the service discovering unit perceives the receiving unit. As discussed above, in the IMS network, the service discovering unit may be located in the bearer network layer or the service layer.

In the bearer network layer, the service discovering unit may perceive the receiving unit as follows. A network attachment apparatus sends the network attachment information of the receiving unit to the service discovering unit after successfully processing the network attachment request of the receiving unit. Alternatively, the service discovering unit actively queries the information of the receiving unit that has completed network attachment from the network attachment apparatus. Alternatively, the service discovering unit is located in the network attachment apparatus, so that the service discovering unit obtains the information of the receiving unit through an interface inside the entity.

In the service layer, the service discovering unit may perceive the receiving unit as follows. The entity that processes the IMS registration sends IMS registration information of the receiving unit to the service discovering unit after successfully processing the IMS registration request of the receiving unit. Alternatively, the service discovering unit actively subscribes to or queries information of the receiving unit that has completed the IMS registration from the IMS registration entity. Alternatively, the service discovering unit is located in the IMS registration entity, so that the service discovering unit obtains the IMS registration information of the receiving unit through an interface inside the entity.

In these processes, the service discovering unit also needs to obtain the emergency event alert service discovering information, which may be preset on the service discovering unit, or may also be queried and obtained from an external database by the service discovering unit during processing of the service discovering.

The emergency event alert service discovering request message may be a DHCP request message, an SIP Register message, a DIAMETER message, a RADIUS message, and other proprietary messages.

The emergency event alert service discovering indication message may be a DIAMETER message, an SIP message, a RADIUS message, and the like.

After the receiving unit obtains the information related to the distributing unit, attachment of the emergency event alert service may be performed subsequently.

In Step 202, the receiving unit is attached to the emergency event alert service.

The attachment of the receiving unit to the emergency event alert service means that preparations for the receiving unit to receive the emergency event alert are made. That is, after the service attachment, the receiving unit can receive the emergency event alert message sent by the distributing unit.

Specifically, the receiving unit is attached to the emergency event alert service by sending an emergency event alert service attachment request to the distributing unit through the E2 interface after obtaining the emergency event alert service discovering information in Step 201.

In the embodiment of the present invention, the emergency event alert message is sent in a multicast manner. The receiving unit may attach to the emergency event alert service in the following manners:

If information about the multicast address for the distributing unit to send the emergency event alert is obtained by the receiving unit, the receiving unit sends a request message for joining a corresponding multicast group to the distributing unit, for example, Internet Group Management Protocol (IGMP) joining message (that is, an IGMP join message), so as to prepare to receive the emergency event alert message sent by using the multicast address. Also, in order to receive the emergency event alert message at any time, the emergency event alert receiving unit does not leave the multicast group after joining the multicast group. After the receiving unit is restarted or a network communication interruption is recovered, the receiving unit needs to join the multicast group again. Alternatively, when the network attachment or the IMS registration is required again, the receiving unit needs to perform the service discovering and the service attachment again, that is, to join the multicast group again.

Alternatively, if indirect distributing unit information of the distributing unit is obtained by the receiving unit, for example, address information of a database server, the receiving unit first obtains the indirect information, and then further obtains direct information of the distributing unit. For example, the address information of the database server is first obtained, and then the address information of the emergency event alert distributing unit is obtained from the database server. After the multicast address for the distributing unit to send an emergency event alert message is obtained, the request message for joining a corresponding multicast group is then sent to the distributing unit, so as to join the corresponding multicast group and completes the attachment of the emergency event alert service.

In Step 203, the receiving unit receives an emergency event alert message sent by the distributing unit.

Before the receiving unit receives the emergency event alert message sent by the distributing unit, the method further includes the following steps: the distributing unit receives a request message for releasing the emergency event alert sent by a releasing unit; the distributing unit distributes the emergency event alert message to the receiving unit according to the request message.

That is to say, the distributing unit distributes the emergency event alert message to the receiving unit through the E2 interface after receiving the emergency event alert sending request sent by the releasing unit through the E4 interface.

In this step, the distributing unit may receive the emergency event alert in an audio-video form through the M2 interface under the instruction of the emergency event alert message sent through the E4 interface by the releasing unit. Also, the emergency event alert message sent through the E2 interface contains the emergency event alert indication, which instructs the receiving unit to receive the emergency event alert in the audio-video form through the M1 interface.

If the emergency event alert message sent by the distributing unit and received by the receiving unit contains the emergency event alert indication, in Step 203, the method further includes that the receiving unit processes and presents the emergency event alert according to the emergency event alert indication in the emergency event alert message.

That is to say, after the receiving unit receives the emergency event alert message sent through the E2 interface, if the emergency event alert message contains the emergency event alert indication, the receiving unit receives the emergency event alert in the audio-video form through the M1 interface and present the emergency event alert.

The emergency event alert message transmitted on the E4 interface and the emergency event alert message transmitted on the E2 interface are not necessarily consistent. The audio-video transmitted on the M2 interface and the audio-video transmitted on the M1 interface are not necessarily consistent as well. The E4 interface and the M2 interface are external interfaces of the IMS system, which may be uniform interfaces for an EAS center specified by a government department. The uniform interfaces may be connected to other communication networks besides the IMS network. The E2 interface and the M1 interface are internal interfaces of the IMS network, which are defined within the IMS network. The distributing unit may be located between the E4 interface and the E2 interface. Format conversion is performed between the M2 interface and the M1 interface. For example, audio-video code on the M2 interface is in a certain format, and audio-video code transmitted on the M1 interface may be converted into another format. Besides, the distributing unit may also be modified in terms of the transmission manner. For example, unicast is performed on the E4 interface and the M2 interface, and media stream negotiation of unicast may be performed on the E4 interface to establish an M2 media channel. Multicast is used on the E2 interface and M1 interface, and an address of a multicast media stream of the receiving unit is indicated on the E2 interface, so that the receiving unit receives the multicast media stream by joining the multicast group. However, the service layer content transmitted between the E4 interface and the E2 interface and between the M2 interface and the M1 interface must be consistent. That is, the content of the emergency event alert must remain unchanged.

The distributing unit needs to authenticate the releasing unit after receiving an emergency event alert releasing request message sent by the releasing unit through the E4 interface. Validity of the identity of the releasing unit, as well as validity of the emergency event alert message released by the releasing unit may be authenticated by using preset policies and data. After the authentication is passed, the distribution of the emergency event alert is started.

In the embodiment of the present invention, the E2 interface sends the emergency event alert message in a multicast manner. In this way, the receiving unit obtains the multicast address for the distributing unit to send the emergency event alert message through the emergency event alert service discovering, and has already joined the corresponding multicast group during the attachment of the emergency event alert service. When the distributing unit uses the multicast address to send the emergency event alert message, the receiving unit can receive the emergency event alert message.

Compared with the unicast manner, the multicast manner of sending the emergency event alert message greatly lowers requirements for processing performance of the distributing unit, and also greatly lowers bandwidth requirements for the transport network. The multicast manner also avoids the situation that a great number of messages need to be sent instantaneously in the unicast manner. Thus, overload of processing capacity of the distributing unit or transport network congestion may be effectively prevented.

Here, the multicast address of the multicast group which the receiving unit joins during the attachment of the emergency event alert service (that is, the multicast address obtained during the emergency event alert service discovering) and the multicast address used by the distributing unit for sending the emergency event alert message shall be consistent. The distributing unit may obtain the multicast address as follows. The multicast address is preset on the distributing unit, or the distributing unit queries and obtains the multicast address from an external database. For the former one, the preset data has to be consistent with the data preset on the service discovering unit, or be consistent with the data in the external database used by the service discovering unit. For the latter one, the data on the external database used by the distributing unit has to be consistent with the data preset on the service discovering unit, or be consistent with the data on the external database used by the service discovering unit, or the distributing unit and the service discovering unit use the same external database.

The distributing unit may perform certain filtering during the distribution of the emergency event alert message, for example, filtering according to geographic locations. The filtering method may be as follows. The emergency event alert message sent by the releasing unit contains a geographic area code list suitable for the emergency event alert. The distributing unit is a network formed of a plurality of physical entities. Different physical entities may be located in different geographic areas. The emergency event alert message is distributed to the physical entities in the geographic areas conforming to the geographic area code list. These physical entities then send the emergency event alert message to the receiving units conforming to the geographic area code list which the physical entities are responsible for.

The emergency event alert message transmitted on the E2 interface contains an emergency event alert indication. The emergency event alert indication includes types of the emergency event alert (for example, there are three types of the emergency event alert, including a text form, a text-audio form, and an audio-video form) and an emergency indication. And, if the M1 interface needs to be used to transmit an emergency event alert media stream in the audio-video form, the emergency event alert indication further includes information such as a parameter of the M1 interface configured to transmit the emergency event alert media stream and an audio-video encoding/decoding manner.

In an embodiment of the present invention, the M1 interface may use a multicast manner. In this case, the parameter of the M1 interface may be the multicast address information which is configured to send the audio-video media stream directly. The receiving unit joins the corresponding multicast group, receives the multicast audio-video media stream, and plays and outputs the media stream according to the emergency event alert indication. The multicast address may be a specific dedicated multicast address, or a common multicast address.

The parameter of the M1 interface may also be a broadcast address. In this case, the receiving unit receives an audio-video media stream from the broadcast address according to the emergency event alert indication, (for example, tuned to a corresponding frequency), and plays and outputs the media stream.

The parameter of the M1 interface may also be other application layer addresses, for example, an FTP address or an HTTP address. In this case, the receiving unit needs to obtain content of the address indication according to the emergency event alert indication, for example, to use FTP or HTTP to obtain the audio-video content, and play and output the content.

The parameter of the M1 interface may also be an IPTV channel identity. The receiving unit switches to the channel according to the emergency event alert indication to receive and play the audio-video media content of the channel. The IPTV channel identity may be a specific channel identity dedicated to sending an emergency event alert media stream, or a common channel identity.

If the parameter of the M1 interface is the IPTV channel identity, the receiving unit may be switched to the indicated channel as follows:

1) If the receiving unit is playing live content (not time-shift content) of the channel indicated by the IPTV channel identity, the receiving unit continues playing the channel.

2) If the receiving unit is playing pause live content of the channel indicated by the IPTV channel identity, the receiving unit terminates the pause live state, and switches to a live state.

3) If the receiving unit is playing content of another channel different from the channel indicated by the IPTV channel identity, and both of the two channels belong to the same network, for example, belong to the same visit domain or home domain, the receiving unit performs channel switching to the channel indicated by the IPTV channel identity.

4) The receiving unit is playing content of another channel different from the channel indicated by the IPTV channel identity, and the two channels belong to different domains (for example, a user terminal roams to one visit domain, but is playing content of a channel in the home domain), the channel identity in the information of the emergency event alert indication is the channel identity of the visit domain. The receiving unit stops playing the content of the other channel (releases the current service, or stops temporarily the current media stream, or only does not present the media stream), and initiates a broadcast request of the channel indicated by the IPTV channel identity to the domain where the IPTV channel identity is located.

5) If the receiving unit is playing a VOD program or a local program, or performs local menu operations, the receiving unit stops or stops temporarily the current program or operation, and initiates a live program service request. The request contains the IPTV channel identity.

6) The receiving unit is in an idle state, and no live channel program or other types of programs are played. The receiving unit initiates the live program service request. The request contains the IPTV channel identity.

In the process that the receiving unit presents the emergency event alert, cooperative processing needs to be performed according to requirements of the emergency event alert indication carried in the emergency event alert message. For example, the currently played program is stopped or paused, and is forcedly switched to the playing of the audio-video media stream of the emergency event alert received through the M1 interface. No matter whether the current user is watching the IPTV program, performing video calling, playing games, watching the locally saved program, or performing menu operations, the forced switching operation is performed, so that the user can obtain the emergency event alert in time. The cooperative processing may be compulsorily specified by the government department. For example, in the IMS network, the UE has to meet related compulsory standards of the emergency event alert service before accessing the network.

Network bandwidth resource on the M1 interface for transmitting the audio-video media stream should be ensured, especially when the parameter of the M1 interface is directly the multicast address and the receiving unit joins the corresponding multicast group directly. Also, the bandwidth occupied by the emergency event alert service must be more than that occupied by other services due to the particularity of the emergency event alert service. If the user is using services that occupy relatively more bandwidth, and no bandwidth remains or the remaining bandwidth is insufficient, the bandwidth for the emergency event alert service still needs to be ensured. While, the bandwidth occupied by other services in use needs to be overridden. That is, dynamic bandwidth adjustment needs to be performed. The bandwidth used by other services needs to be reduced or even deprived, and be provided to the emergency event alert service.

The bandwidth policy of the emergency event alert service provided in the embodiment of the present invention includes the following implementations:

1) The bandwidth policy of the emergency event alert service may be preset, that is, in a policy enforcement entity or a policy decision entity of the bearer layer. To realize the presetting, related parameters of the media stream of the emergency event alert service must be obtained in advance. For example, if the emergency event alert is sent in a multicast manner, the multicast address needs to be obtained in advance. The bandwidth requirement and priority of the media stream of the multicast address need to be preset on the policy enforcement entity or the policy decision entity of the bearer layer.

When the bandwidth policy is preset in the policy enforcement entity, after detecting the emergency event alert media stream according to these parameters, the policy enforcement entity performs the preset policy automatically and assigns the corresponding bandwidth, and overrides the bandwidth for other services as required. After detecting that the emergency event alert is ended according to these parameters (for example, through traffic detection), the policy enforcement entity releases the assigned bandwidth automatically and recovers the bandwidth for other services that is overridden.

Alternatively, when the bandwidth policy is preset in the policy decision entity of the bearer layer, the policy decision entity may control the policy enforcement entity to execute the bandwidth policy in a PUSH or a PULL manner. For example, after the bandwidth policy is set in the policy decision entity of the bearer layer, the policy decision entity of the bearer layer pushes the bandwidth policy to all the policy enforcement entities which are managed by the policy decision entity. Alternatively, when the policy enforcement entity requests the policy decision entity for the bandwidth policy of a service, the policy decision entity contains the bandwidth policy of the emergency event alert in a response message.

The bandwidth policy of the emergency event alert service may be delivered to the policy enforcement entity or the policy decision entity of the bearer layer after the distributing unit perceives that the receiving unit has completed the network attachment, or in the process for processing the attachment of the emergency event alert service of the receiving unit. For example, an EAS AS perceives that the receiving unit has completed the network attachment, and delivers a bearer policy to the bearer layer.

2) The bandwidth policy of the emergency event alert service may be delivered to the bearer layer in the process that the distributing unit distributes the emergency event alert. That is, when the distributing unit needs to send an emergency event alert media stream, the distributing unit delivers a bearer policy to the bearer layer, requests to reserve corresponding bandwidth, and indicates the priority, so as to override the bandwidth of other services as required. When the emergency event alert is ended, the distributing unit delivers a bearer policy to the bearer layer, requests to release the corresponding assigned bandwidth, and recovers the overridden bandwidth for other services. For example, in the process that the EAS AS distributes the emergency event alert service, the EAS AS requests a Resource and Admission Control Subsystem (RACS) to reserve the bandwidth resource and indicate the priority of the resource. Alternatively, after an ECF/EFF receives the emergency event alert message or the emergency event alert video media-stream, the ECF/EFF requests the RACS to reserve the bandwidth resource and indicate the priority of the resource.

3) The bandwidth policy of the emergency event alert service may be delivered to the bearer layer after the distributing unit receives the media content of the emergency event alert requested by the receiving unit. For example, after the ECF/EFF receives an IGMP Join message for joining a multicast group (the multicast group which is configured to send the audio-video media stream of the emergency event alert) sent by the receiving unit, the ECF/EFF requests the RACS to reserve the bandwidth resource and indicate the priority of the resource. Here, the ECF/EFF should be able to identify that the multicast address is the multicast address of the emergency event alert. An emergency indication may be carried in the IGMP Join message, or the multicast address is a particular preset multicast address, or the multicast address obtained by the ECF/EFF after the ECF/EFF receives the emergency event alert message is the multicast address of the emergency event alert media stream.

4) The bandwidth policy of the emergency event alert service may also be as follows: the policy enforcement entity of the bearer layer is requested by the receiving unit to assign the corresponding bandwidth and override the bandwidth for other services as required after the receiving unit receives the emergency event alert message. When the emergency event alert is ended, the receiving unit requests the policy enforcement entity of the bearer layer to release the corresponding assigned bandwidth, and recovers the bandwidth for the other services. For example, the UE receives the emergency event alert message. The emergency event alert indication in the message contains the emergency indication and a multicast address configured to transmit the audio-video media stream. The UE requests the RACS to reserve the bandwidth resource and indicate the priority of the resource.

5) The bandwidth policy of the emergency event alert service may also be as follows: the establishment of an emergency event alert session is initiated by the receiving unit after the receiving unit receives an emergency event alert receiving message; the bandwidth resource is reserved through the establishment of the session, that is, in the process of the session establishment, the resource is reserved through the exchange between the CSCF and the RACS. In this case, the parameter of the M1 interface carried in the emergency event alert message is usually the IPTV channel identity. The channel identity includes two situations. One is that the channel identity is a special channel identity dedicated to sending the emergency event alert media stream. The other is that the channel identity is a common channel identity, which usually provides the IPTV program, and is used to send an emergency event alert media stream when necessary. The emergency event alert session initiated and established by the receiving unit is an emergency session, and the session establishment request message may contain the emergency indication, or the network side CSCF identifies a request as an emergency session establishment request according to the channel identity of the request. When the RACS is requested to reserve the bandwidth resource, the priority of the service may be indicated to override the bandwidth occupied by other services when necessary, assuring the bandwidth for the emergency event alert media stream.

In an embodiment, the present invention provides a method for receiving an emergency event alert. After a receiving unit discovers an emergency event alert service, the receiving unit attaches to the emergency event alert service and receives an emergency event alert message sent by a distributing unit. When the emergency event alert message contains an emergency event alert indication, the receiving unit processes and presents the corresponding emergency event alert according to the emergency event alert indication. In the method provided according to an embodiment of the present invention, the distributing unit distributes the emergency event alert message in a multicast manner, so that problems such as bearer network congestion and processing capacity overload of a message sending unit due to a message storm that might occur when the emergency event alert service is sent are prevented effectively. The emergency event alert message is received through the multicast address that the receiving unit attaches to the distributing unit, so that a user equipment can receive the emergency event alert in time as long as communication between the user equipment and the bearer network is normal, no matter whether the user terminal is watching live television programs.

In the method provided according to the embodiment of the present invention, through the provided bandwidth policy of the emergency event alert service, the terminal of the IMS network can receive the emergency event alert in time, no matter what program the terminal is enjoying, for example, watching IPTV programs or playing games, or watching programs locally saved in the terminal, or performing menu operations, or no matter what communication is being performed, for example, a video calling. Also, an emergency event alert service can be provided in various service exceptions, for example, in various states such as user defaulting or suspension, a state that no IPTV service is used, and a roaming state. As long as a user is successfully registered with the IMS network, the user can receive the emergency event alert service. Even in situations that the user terminal is not registered with the IMS network successfully, the IMS network registration fails, or the roaming is restricted, as long as the communication between the terminal and the bearer network is normal, the user terminal can receive the emergency event alert service.

The method for receiving the emergency event alert according to the embodiment of the present invention is further illustrated in the following with specific embodiments.

Embodiment 1

Figure 3:
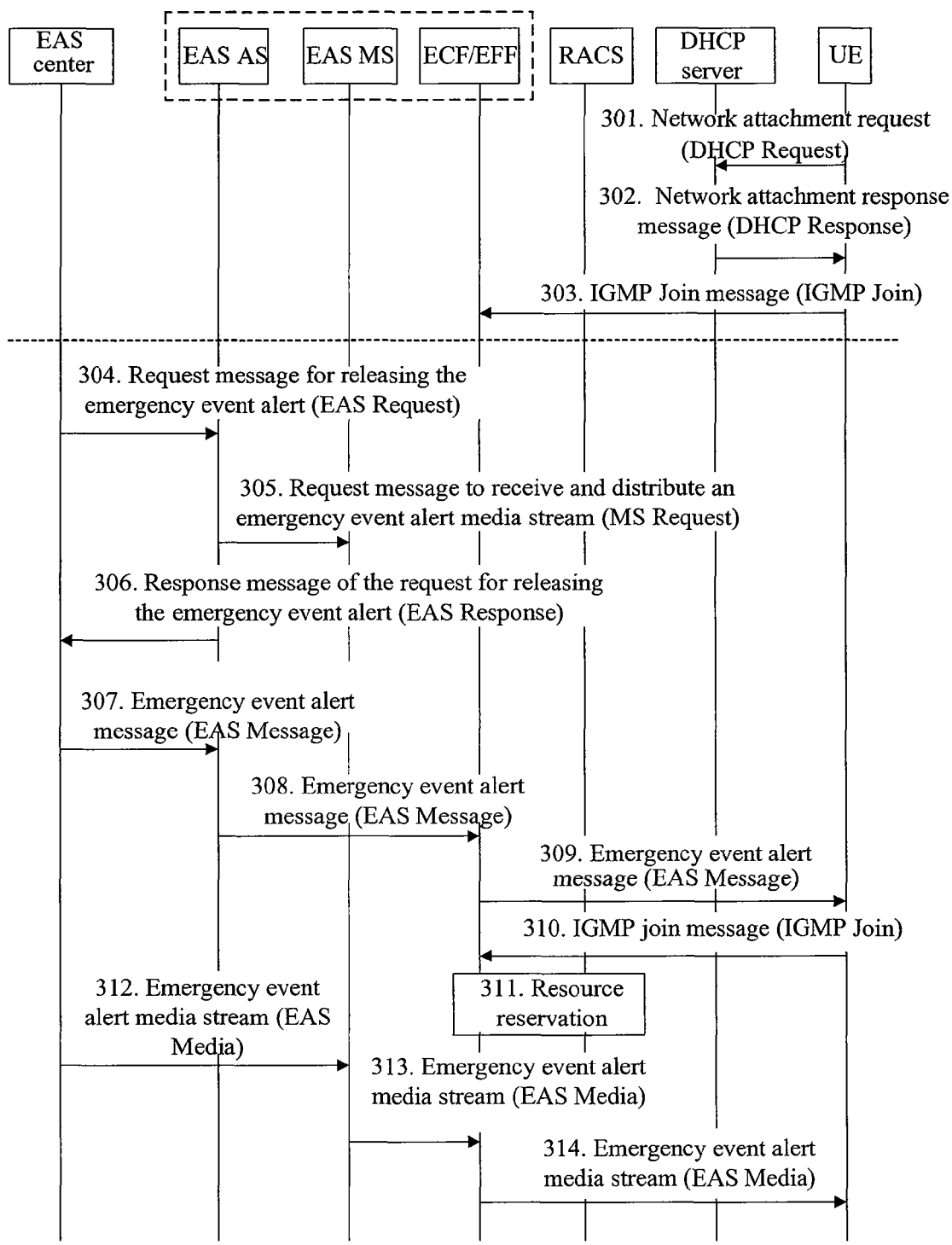
FIG. 3 is a flow chart of a method for receiving an emergency event alert according to a first embodiment of the present invention.

FIG. 3 is a flow chart of a method for receiving an emergency event alert according to a first embodiment of the present invention. In the first embodiment of the present invention, an EAS center of a government department is a releasing unit of the emergency event alert, an EAS AS, an EAS media server (EAS MS), and a multicast ECF/EFF in an IMS network are distributing units of the emergency event alert. A DHCP server is a service discovering unit of the emergency event alert. A UE is a receiving unit of the emergency event alert.

In Step 301, the UE sends a network attachment request (DHCP Request) to the DHCP server.

In Step 302, the DHCP server returns a network attachment response message (DHCP Response) to the UE. The response message contains emergency event alert service discovering information.

In the first embodiment, the UE completes the emergency event alert service discovering in a process for the network attachment.

Here, an emergency event alert message is transmitted in a multicast manner. The emergency event alert service discovering information is a multicast address for sending the emergency event alert message.

In Step 303, the UE sends an IGMP Join message to the ECF/EFF.

After the UE obtains the multicast address, the UE joins a corresponding multicast group, completes the attachment of the emergency event alert service, and prepares to receive the emergency event alert message.

In Step 304, the EAS center sends a request message for releasing the emergency event alert (EAS Request) to the EAS AS.

In the embodiment of the present invention, the emergency event alert includes an audio-video media stream. The request message for releasing the emergency event alert sent by the EAS center contains an emergency event alert indication, indicating that an audio-video media stream needs to be received.

In Step 305, the EAS AS sends a request message for receiving and distributing an emergency event alert media stream to the EAS MS (MS Request).

In Step 306, the EAS AS sends a response message of the request for releasing the emergency event alert to the EAS center (EAS Response).

Here, the EAS AS may authenticate the EAS center. The authentication includes authentication on validity of the identity of the EAS center and on validity of the emergency event alert message released by the EAS center.

In Step 307, the EAS AS receives the emergency event alert message (EAS Message) released by the EAS center.

In Step 308, the EAS AS distributes the emergency event alert message (EAS Message) to the ECF/EFF.

In Step 309, the UE receives the emergency event alert message (EAS Message) from the ECF/EFF.

In Step 310, the UE sends the IGMP Join message to the ECF/EFF.

The UE obtains a multicast address for sending an emergency event alert media stream according to the emergency event alert indication in the emergency event alert message, and joins a corresponding multicast group of the emergency event alert media stream to receive the emergency event alert in an audio-video form.

In Step 311, the ECF/EFF interacts with an RACS to perform resource reservation.

Specifically, this step is as follows: the ECF/EFF processes the multicast group joining request message, requests the RACS to reserve a bearer resource, and contains a priority of the bearer resource to be reserved according to the identified multicast address or emergency indication.

Here, the multicast address of the audio-video media stream may be a specific multicast address. When the ECF/EFF interacts with the RACS to perform resource reservation after identifying the specific multicast address, the ECF/EFF contains the priority of the applied resource, instructs to override the bandwidth occupied by other services when bandwidth is insufficient. The multicast address may also be a common multicast address. The IGMP Join message sent by the UE contains the emergency indication. The ECF/EFF determines the priority of the applied resource according to the emergency indication.

In Step 312, the EAS MS receives the released emergency event alert media stream (EAS Media) from the EAS center.

In Step 313, the EAS MS distributes the emergency event alert media stream (EAS Media) to the ECF/EFF.

In Step 314, the UE receives the emergency event alert media stream (EAS Media) from the ECF/EFF, and plays and outputs the media stream.

Embodiment 2

Figure 4:
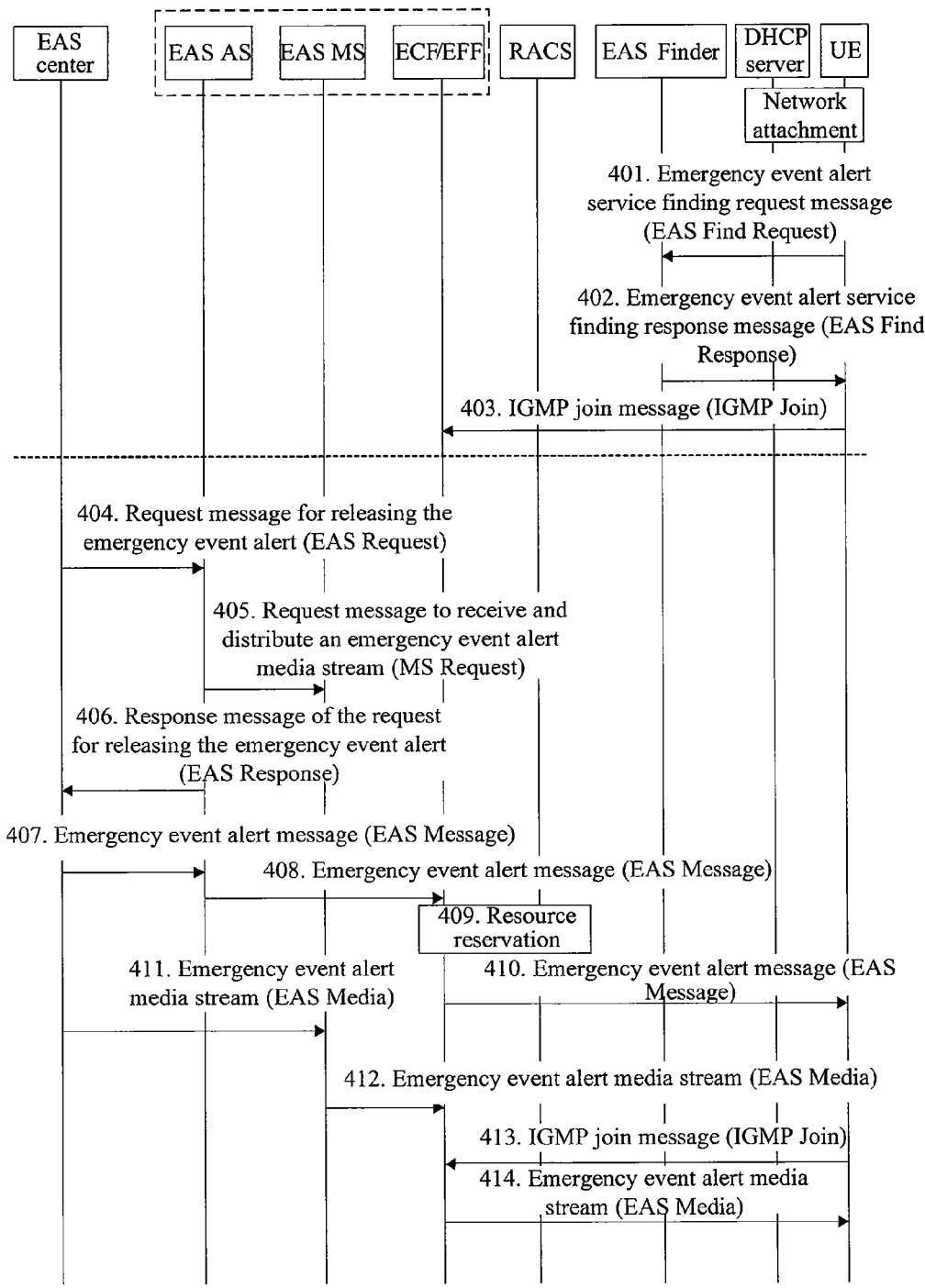
FIG. 4 is a flow chart of a method for receiving an emergency event alert according to a second embodiment of the present invention.

FIG. 4 is a flow chart of a method for receiving an emergency event alert according to a second embodiment of the present invention. In the second embodiment of the present invention, an EAS center of a government department is a releasing unit of the emergency event alert. An EAS AS, an EAS MS, and a multicast ECF/EFF in an IMS network are distributing units of the emergency event alert. An EAS discoverer is a service finding unit of the emergency event alert. A UE is a receiving unit of the emergency event alert.

In Step 401, the UE sends an emergency event alert service discovering request message (EAS Discover Request) to the EAS discoverer.

In Step 402, the EAS discoverer returns an emergency event alert service discovering response message (EAS Discover Response) to the UE. The message contains the emergency event alert service discovering information.

In the second embodiment of the present invention, after the UE completes the network attachment, the UE performs the emergency event alert service discovering. The emergency event alert service discovering request message can be sent in a broadcast manner. The EAS discoverer, which is an entity that processes the emergency event alert service discovering, processes the broadcast message.

Here, an emergency event alert message is transmitted in a multicast manner. The emergency event alert service discovering information is a multicast address for sending the emergency event alert message.

In Step 403, the UE sends an IGMP Join message to the ECF/EFF.

After the UE obtains the multicast address in the received emergency event alert service discovering information, the UE joins a corresponding multicast group, completes attachment of the emergency event alert service, and prepares to receive the emergency event alert message.

In Step 404, the EAS center sends a request message for releasing the emergency event alert (EAS Request) to the EAS AS.

In the embodiment of the present invention, the emergency event alert includes the audio-video media stream. The request message for releasing the emergency event alert sent by the EAS center contains an emergency event alert indication, indicating that an audio-video media stream needs to be received.

In Step 405, the EAS AS sends a request to receive and distribute an emergency event alert media stream (MS Request) to the EAS MS.

In Step 406, the EAS AS returns a response message of the request for releasing the emergency event alert (EAS Response) to the EAS center.

Here, the EAS AS may authenticate the EAS center. The authentication includes authentication on validity of the identity of the EAS center and on validity of the emergency event alert message released by the EAS center.

In Step 407, the EAS AS receives the emergency event alert message (EAS Message) released by the EAS center.

In Step 408, the EAS AS distributes the emergency event alert message (EAS Message) to the ECF/EFF.

In Step 409, the ECF/EFF interacts with an RACS to perform resource reservation.

Specifically, this step is as follows: the ECF/EFF interacts with the RACS to reserve a bearer resource according to the parameter of the audio-video media stream carried in the emergency event alert indication after the ECF/EFF receives the emergency event alert message (EAS Message). Here, the ECF/EFF contains the priority of the applied resource when the ECF/EFF interacts with the RACS to perform resource reservation through the identified emergency event alert message, and instructs to override the bandwidth occupied by other services when the bandwidth is insufficient.

In Step 410, the UE receives the emergency event alert message (EAS Message) from the ECF/EFF.

In Step 411, the EAS MS receives the released emergency event alert media stream (EAS Media) from the EAS center.

In Step 412, the EAS MS distributes the received emergency event alert media stream (EAS Media) to the ECF/EFF.

In Step 413, the UE sends an IGMP Join message to the ECF/EFF.

The UE obtains a multicast address for sending an emergency event alert media stream according to the emergency event alert indication in the emergency event alert message, joins a corresponding multicast group of the emergency event alert media stream, and receives the emergency event alert in an audio-video form.

In Step 414, the UE receives the emergency event alert media stream (EAS Media) from the ECF/EFF, and plays and outputs the media stream.

Embodiment 3

Figure 5:
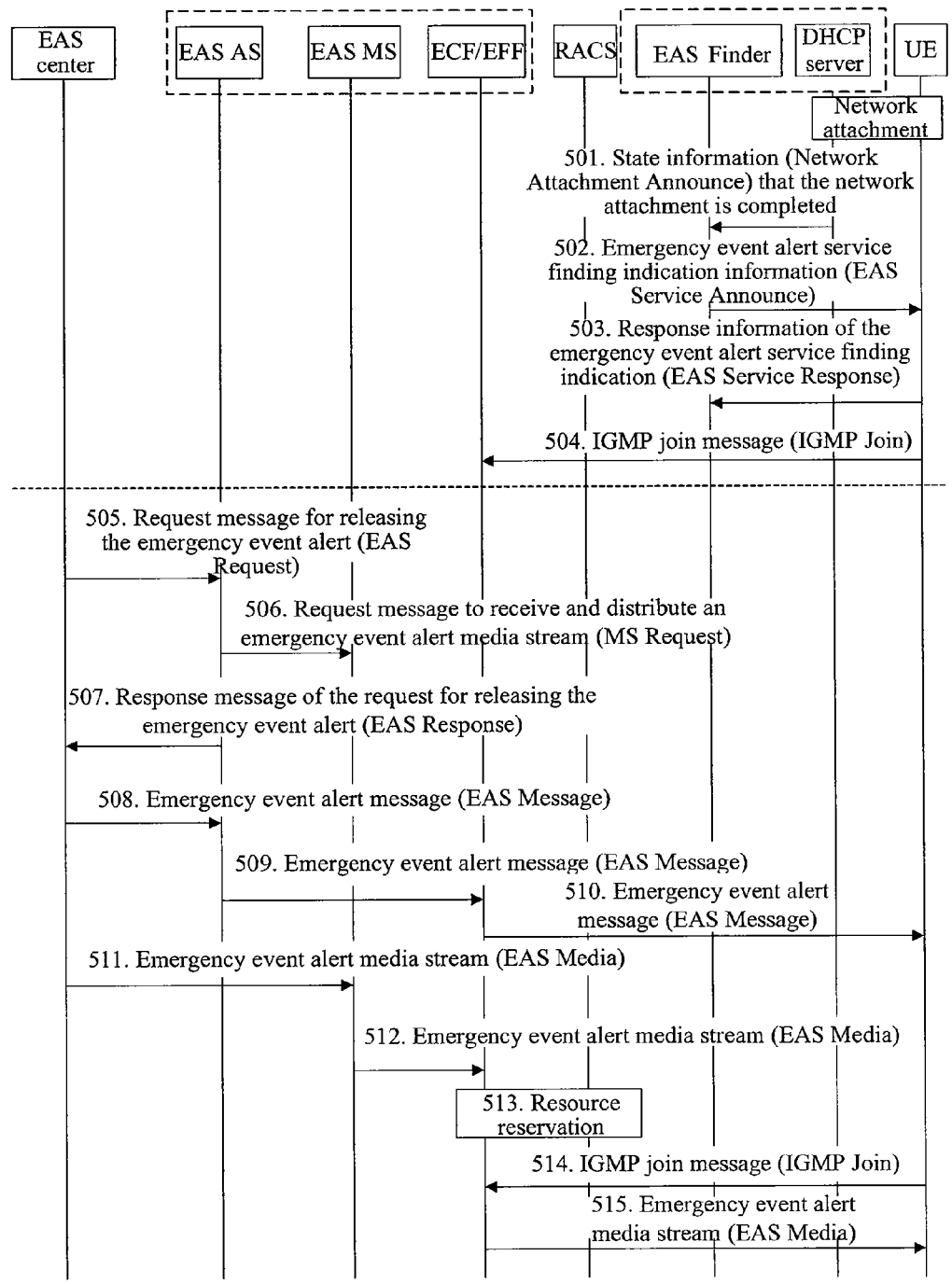
FIG. 5 is a flow chart of a method for receiving an emergency event alert according to a third embodiment of the present invention.

FIG. 5 is a flow chart of a method for receiving an emergency event alert according to a third embodiment of the present invention. In the third embodiment of the present invention, an EAS center of a government department is a releasing unit of the emergency event alert. An EAS AS, an EAS MS, and a multicast ECF/EFF in an IMS network are distributing units of the emergency event alert. An EAS discoverer and a DHCP server are service discovering units of the emergency event alert. A UE is a receiving unit of the emergency event alert.

In Step 501, the DHCP server actively reports state information (Network Attachment Announce) of the network attachment of the UE to the EAS discoverer after the DHCP server completes processing the network attachment of the UE.

In the third embodiment of the present invention, after the network attachment between the UE and the DHCP server is completed, the emergency event alert service discovering is performed. Here, for the emergency event alert service discovering in a PUSH manner, after the EAS discoverer, which is the entity configured to discover the emergency event alert service, perceives that the UE has completed the network attachment (to be specific here, the DHCP server actively reports to the EAS discoverer after the DHCP server processes the network attachment of the user), the EAS discoverer actively sends emergency event alert service discovering indication information to the UE.

In Step 502, the EAS discoverer actively sends the emergency event alert service discovering indication information (EAS Service Announce) to the UE.

Here, the emergency event alert message is transmitted in a multicast manner. The emergency event alert service discovering information is a multicast address for sending the emergency event alert message.

In Step 503, the UE returns response information of the emergency event alert service discovering indication (EAS Service Response) to the EAS discoverer.

In Step 504, the UE sends an IGMP Join message to the ECF/EFF.

After the UE obtains the multicast address from the received emergency event alert service discovering information, the UE requests to join a corresponding multicast group, completes the attachment of the emergency event alert service, and prepares to receive the emergency event alert message.

In Step 505, the EAS center sends a request message for releasing the emergency event alert (EAS Request) to the EAS AS.

In the embodiment of the present invention, the emergency event alert includes an audio-video media stream. The request message for releasing the emergency event alert sent by the EAS center contains an emergency event alert indication, indicating that an audio-video media stream needs to be received.

In Step 506, the EAS AS sends a request for receiving and distributing an emergency event alert media stream (MS Request) to the EAS MS.

In Step 507, the EAS AS returns a response message of the request for releasing the emergency event alert (EAS Response) to the EAS center.

In Step 508, the EAS AS receives an emergency event alert message released by the EAS center (EAS Message).

In Step 509, the EAS AS distributes the emergency event alert message (EAS Message) to the ECF/EFF.

In Step 510, the UE receives the emergency event alert message (EAS Message) from the ECF/EFF.

In Step 511, the EAS MS receives the released emergency event alert media stream (EAS Media) from the EAS center.

In Step 512, the EAS MS distributes the received emergency event alert media stream (EAS Media) to the ECF/EFF.

In Step 513, the ECF/EFF interacts with an RACS to perform resource reservation.

Specifically, this step is as follows: the ECF/EFF interacts with the RACS to reserve a bearer resource after the ECF/EFF receives the emergency event alert media stream. Here, after the ECF/EFF receives the emergency event alert message, the ECF/EFF obtains a multicast address for sending the emergency event alert media stream from the emergency event alert indication. When the media stream of the multicast address reaches, the ECF/EFF interacts with the RACS to perform resource reservation, contains the priority of the applied resource, and instructs the RACS to override the bandwidth occupied by other services when bandwidth is insufficient.

In Step 514, the UE sends an IGMP Join message to the ECF/EFF.

The UE obtains a multicast address for sending the emergency event alert media stream according to the emergency event alert indication in the emergency event alert message, and joins a corresponding multicast group of the emergency event alert media stream to receive the emergency event alert in an audio-video form.

In Step 515, the UE receives the emergency event alert media stream (EAS Media) from the ECF/EFF, and plays and outputs the media stream.

Embodiment 4

Figure 6:
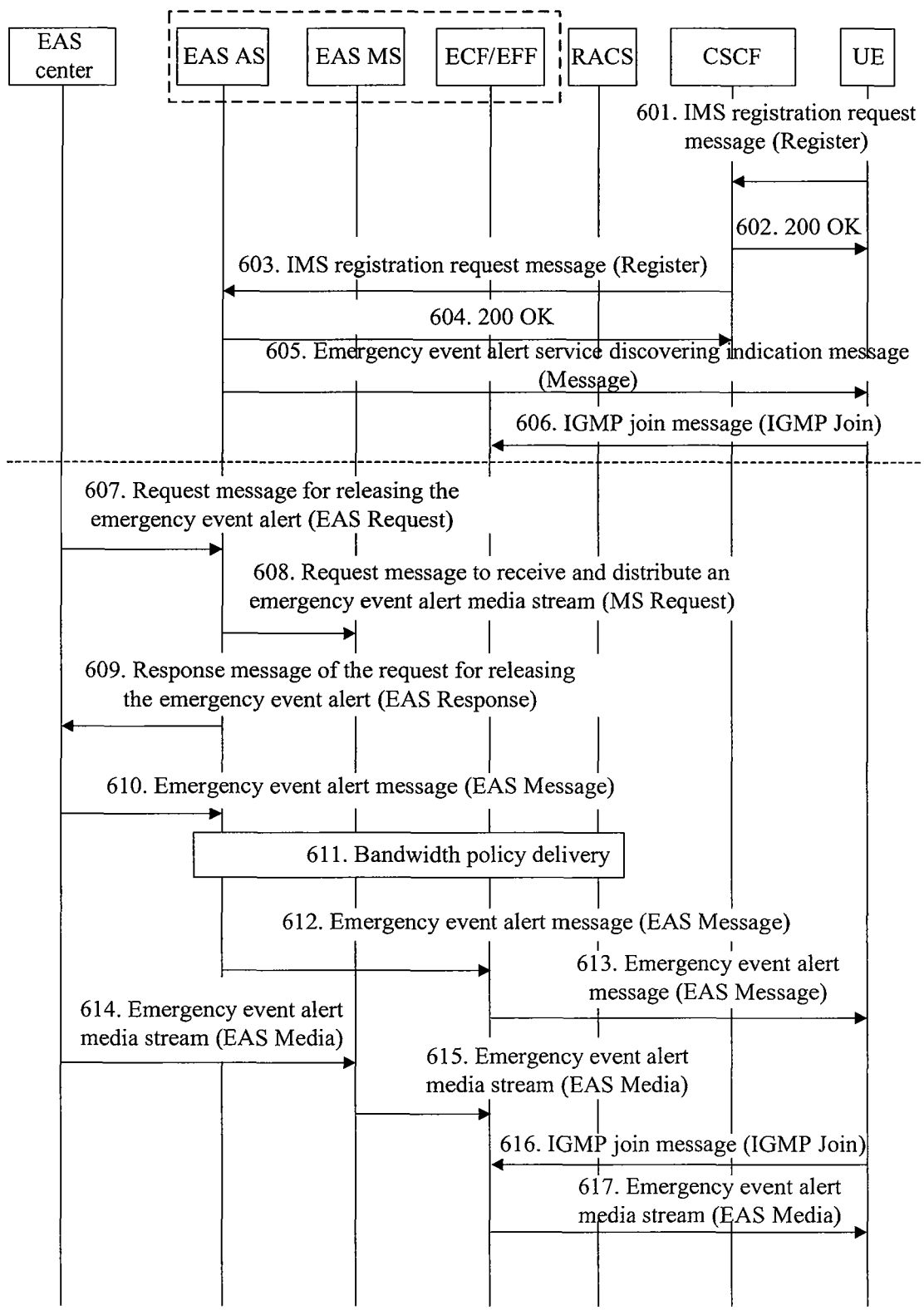
FIG. 6 is a flow chart of a method for receiving an emergency event alert according to a fourth embodiment of the present invention.

FIG. 6 is a flow chart of a method for receiving an emergency event alert according to a fourth embodiment of the present invention. In the fourth embodiment of the present invention, an EAS center of the government department is a releasing unit of the emergency event alert. An EAS AS, an EAS MS, and a multicast ECF/EFF in an IMS network are distributing units of the emergency event alert. A CSCF and the EAS AS are service discovering units of the emergency event alert. A UE is a receiving unit of the emergency event alert.

In Step 601, the UE sends an IMS registration request message (Register) to the CSCF.

In Step 602, the CSCF returns a 200 OK message to the UE, and completes IMS registration of the UE.

In Step 603, the CSCF sends a third-party IMS registration request message (Register) to the EAS AS.

In Step 604, the EAS AS returns the 200 OK message to the CSCF, and completes the third-party IMS registration.

In Step 605, the EAS AS actively sends an emergency event alert service discovering indication message (Message) to the UE.

In the fourth embodiment of the present invention, the UE discovers the emergency event alert service through the third-party registration in the process of the IMS registration. Here, the service discovering is in a PUSH manner. After the CSCF processes the IMS registration request of the UE, the CSCF sends a third-party registration request to the EAS AS. After the EAS AS processes the third-party registration, the EAS AS actively sends the emergency event alert service discovering indication message to the UE.

Here, an emergency event alert message is transmitted in a multicast manner. The emergency event alert service discovering information is a multicast address for sending the emergency event alert message.

In Step 606, the UE sends an IGMP Join message to the ECF/EFF.

After the UE obtains the multicast address from the received emergency event alert service discovering information, the UE joins a corresponding multicast group, completes attachment of the emergency event alert service, and prepares to receive the emergency event alert message.

In Step 607, the EAS center sends a request message for releasing the emergency event alert (EAS Request) to the EAS AS.

In the embodiment of the present invention, the emergency event alert includes an audio-video media stream. The request message for releasing the emergency event alert sent by the EAS center contains an emergency event alert indication, indicating that an audio-video media stream needs to be received.

In Step 608, the EAS AS sends a request to receive and distribute an emergency event alert media stream (MS Request) to the EAS MS.

In Step 609, the EAS AS returns a response message of the request for releasing the emergency event alert (EAS Response) to the EAS center.

In Step 610, the EAS AS receives an emergency event alert message (EAS Message) released by the EAS center.

In Step 611, the EAS AS delivers a bandwidth policy to a bearer layer.

Specifically, this step is as follows: after the EAS AS receives an emergency event alert message, the EAS AS delivers a bandwidth policy to the bearer layer according to a parameter of an audio-video media stream carried in the emergency event alert indication, indicating bandwidth requirements and the priority of the emergency event alert audio-video media stream. Here, the bandwidth policy may be delivered to an RACS, reservation of the bearer resource is completed by the RACS, and bandwidth occupied by other services is overridden when bandwidth is insufficient.

In Step 612, the EAS AS distributes the emergency event alert message (EAS Message) to the ECF/EFF.

In Step 613, the UE receives the emergency event alert message (EAS Message) from the ECF/EFF.

In Step 614, the EAS MS receives the released emergency event alert media stream (EAS Media) from the EAS center.

In Step 615, the EAS MS distributes the received emergency event alert media stream (EAS Media) to the ECF/EFF.

In Step 616, the UE sends an IGMP Join message to the ECF/EFF.

The UE obtains a multicast address for sending the emergency event alert media stream according to an emergency event alert indication in the emergency event alert message, joins a corresponding multicast group of the emergency event alert media stream, and receives the emergency event alert in an audio-video form.

In Step 617, the UE receives the emergency event alert media stream (EAS Media) from the ECF/EFF, and plays and outputs the media stream.

Embodiment 5

Figure 7:
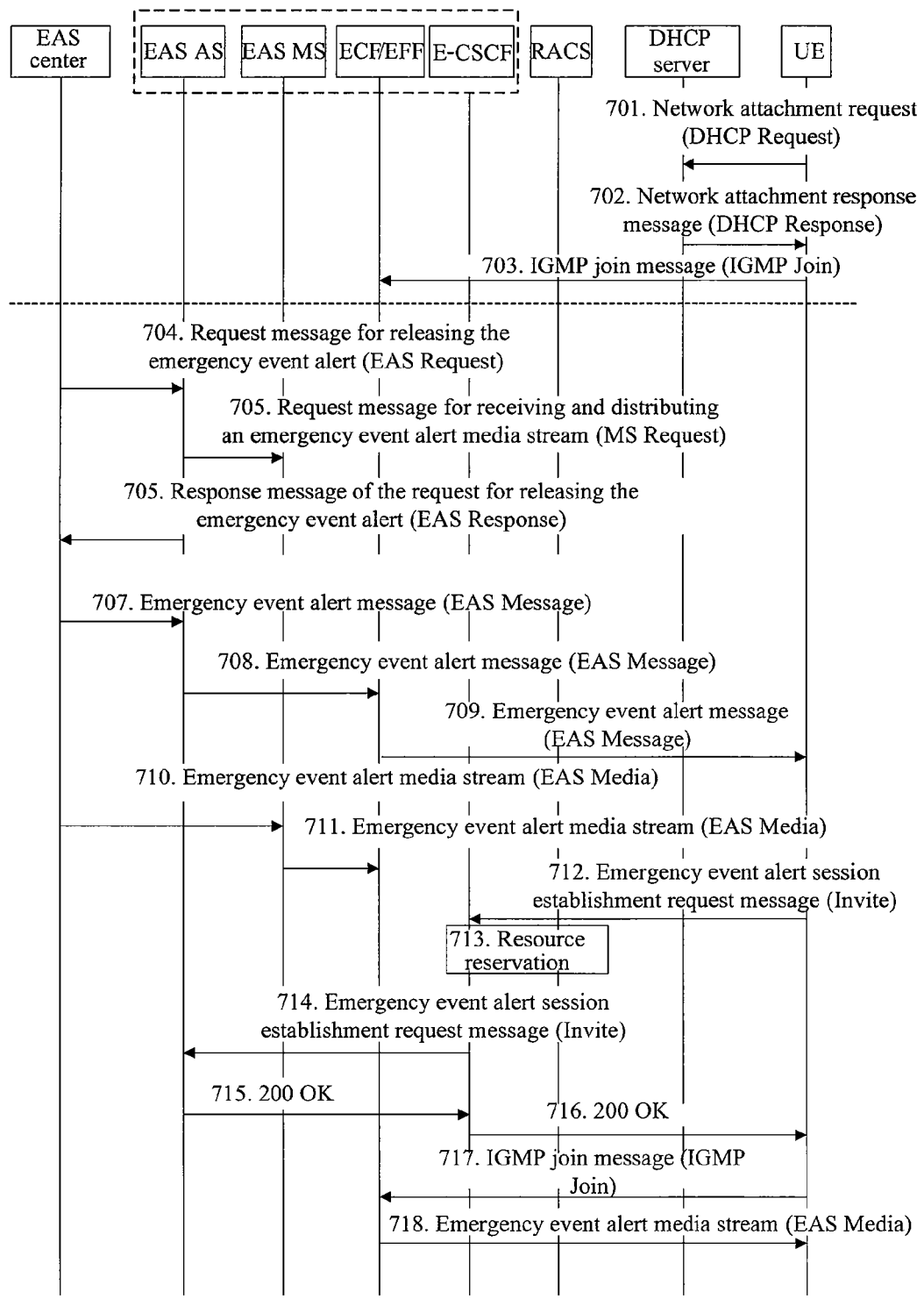
FIG. 7 is a flow chart of a method for receiving an emergency event alert according to a fifth embodiment of the present invention.

FIG. 7 is a flow chart of a method for receiving an emergency event alert according to a fifth embodiment of the present invention. In the fifth embodiment of the present invention, an EAS center of a government department is a releasing unit of the emergency event alert. An EAS AS, an EAS MS, a multicast ECF/EFF, and an emergency-call session control function (E-CSCF) in an IMS network are distributing units of the emergency event alert. A DHCP server is a service discovering unit of the emergency event alert. A UE is a receiving unit of the emergency event alert.

In Step 701, the UE sends a network attachment request message to the DHCP server (DHCP Request).

In Step 702, the DHCP server returns a response message of the network attachment request (DHCP response) to the UE. The response message contains emergency event alert service discovering information.

In the fifth embodiment of the present invention, the UE completes the emergency event alert service discovering in the process of the network attachment.

Here, an emergency event alert message is transmitted in a multicast manner. The emergency event alert service discovering information is a multicast address for sending the emergency event alert message.

In Step 703, the UE sends an IGMP Join message to the ECF/EFF.

After the UE obtains the multicast address from the received emergency event alert service discovering information, the UE joins a corresponding multicast group, completes attachment of the emergency event alert service, and prepares to receive the emergency event alert message.

In Step 704, the EAS center sends a request message for releasing the emergency event alert (EAS Request) to the EAS AS.

In the embodiment of the present invention, the emergency event alert includes an audio-video media stream. The request message for releasing the emergency event alert sent by the EAS center contains an emergency event alert indication, indicating that an audio-video media stream needs to be received.

In Step 705, the EAS AS sends a request for receiving and distributing an emergency event alert media stream (MS Request) to the EAS MS.

In Step 706, the EAS AS returns a response message of the request for releasing the emergency event alert (EAS response) to the EAS center.

In Step 707, the EAS AS receives the emergency event alert message (EAS Release) released by the EAS center.

In Step 708, the EAS AS distributes the emergency event alert message (EAS Message) to the ECF/EFF.

In Step 709, the UE receives the emergency event alert message (EAS Message) from the ECF/EFF.

In the embodiment of the present invention, the emergency event alert includes an audio-video media stream. The emergency event alert message contains an emergency event alert indication. Here, the parameter of the M1 interface in the emergency event alert indication is a channel identity of the emergency event alert, indicating that the UE switch to the indicated channel to receive the audio-video media stream.

In Step 710, the EAS MS receives the released emergency event alert media stream (EAS Media) from the EAS center.

In Step 711, the EAS MS distributes the received emergency event alert media stream (EAS Media) to the ECF/EFF.

In Step 712, the UE initiates an emergency event alert session establishment request message (Invite). The request message contains the channel identity of the emergency event alert, and may contain an emergency indication.

In Step 713, the E-CSCF interacts with an RACS to perform resource reservation.

Specifically, this step is as follows: the E-CSCF processes the emergency event alert session establishment request, requests the RACS to reserve a bearer resource, and contains the priority of the bearer resource to be reserved according to the IPTV channel identity or emergency indication. Here, the channel identity for sending the emergency event alert media stream may be a specific channel identity. In the process that the E-CSCF identifies the specific channel identity and interacts with the RACS to perform the resource reservation, the E-CSCF contains the priority of the applied resource, and instructs to override the bandwidth occupied by other services when bandwidth is insufficient. Alternatively, the channel identity is a common channel identity, the session establishment request message sent by the UE contains an emergency indication, and the E-CSCF determines the priority of the applied resource according to the emergency indication.

In Step 714, the E-CSCF forwards the emergency event alert session establishment request message (Invite) to the EAS AS.

In Step 715, the EAS AS returns a 200 OK response message to the E-CSCF. The response message contains a multicast address of the emergency event alert IPTV channel.

In Step 716, the E-CSCF sends the 200 OK response message to the UE, and completes the establishment of the emergency event alert session.

In Step 717, the UE sends an IGMP Join message to the ECF/EFF.

The UE receives an emergency session response message, establishes an emergency session, obtains a multicast address of the emergency event alert IPTV channel from the response message, and joins a corresponding multicast group of the multicast address to receive an audio-video media stream.

In Step 718, the UE receives the emergency event alert media stream sent by the IPTV channel from the ECF/EFF, and plays and outputs the media stream.

It should be noted that in the fifth embodiment of the present invention, the UE that does not perform IMS registration or the IMS registration fails can receive the emergency event alert, which is realized through the emergency session. Specifically, through the emergency event alert channel identity information or the emergency session identity in the session, the network side performs emergent special processing on the session, so as to enable an unregistered user to initiate the emergency session. And, through the processing of the E-CSCF and the EAS AS, the emergency session is established.

Embodiment 6

Figure 8:
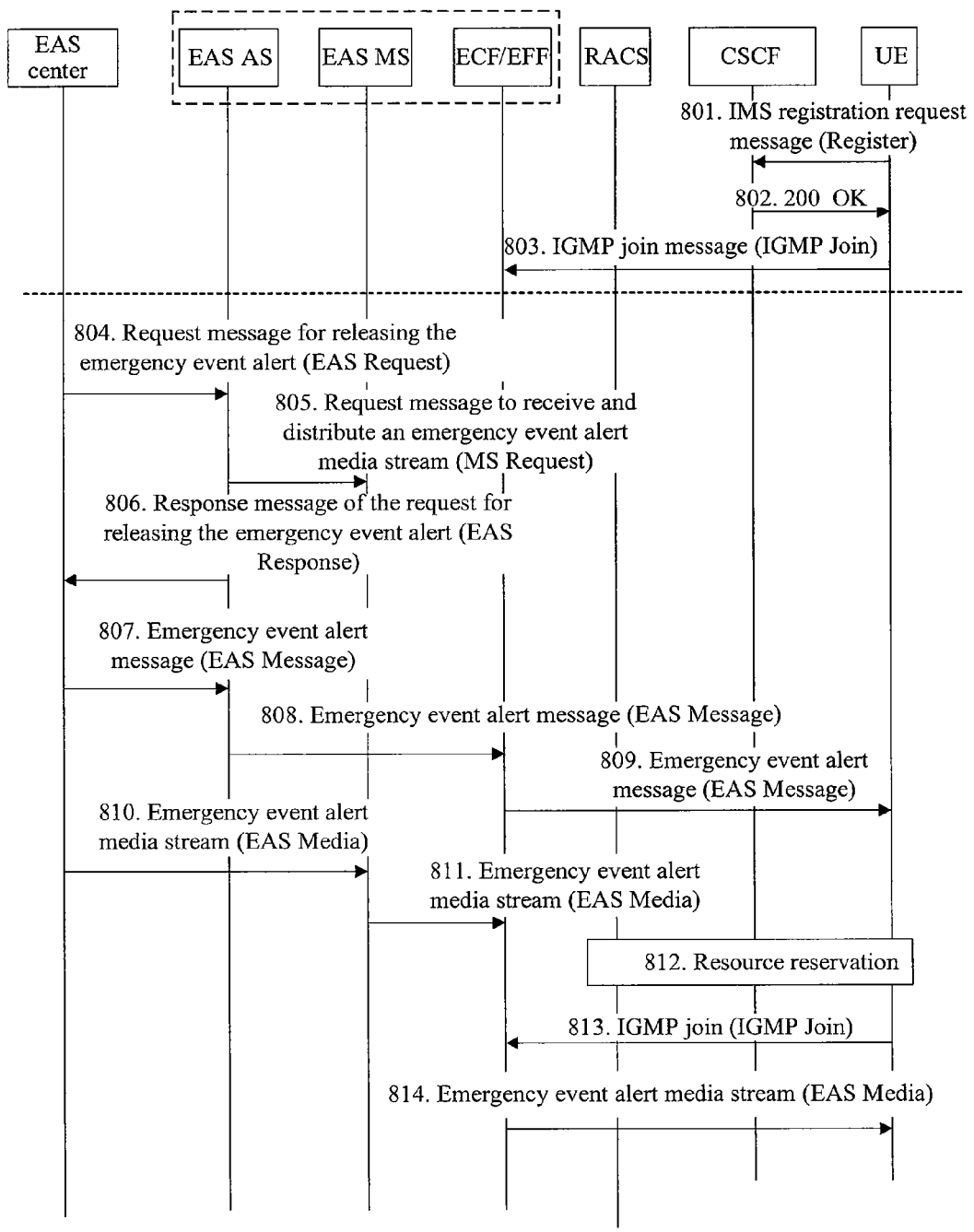
FIG. 8 is a flow chart of a method for receiving an emergency event alert according to a sixth embodiment of the present invention.

FIG. 8 is a flow chart of a method for receiving an emergency event alert according to a sixth embodiment of the present invention. In the sixth embodiment of the present invention, an EAS center of a government department is a releasing unit of the emergency event alert. An EAS AS, an EAS MS, and a multicast ECF/EFF in an IMS network are distributing units of the emergency event alert. A CSCF is a service discovering unit of the emergency event alert. A UE is a receiving unit of the emergency event alert.

In Step 801, the UE sends an IMS registration request message (Register) to the CSCF.

In Step 802, the CSCF returns an IMS registration response message (200 OK) to the UE. The message contains emergency event alert service discovering information.

In the sixth embodiment of the present invention, the UE completes the emergency event alert service discovering in the process of the IMS registration.

Here, the emergency event alert message is transmitted in a multicast manner. The emergency event alert service discovering information is a multicast address for sending the emergency event alert message.

In Step 803, the UE sends an IGMP Join message to the ECF/EFF.

After the UE obtains the multicast address from the received emergency event alert service discovering information, the UE joins a corresponding multicast group, completes attachment of the emergency event alert service, and prepares to receive the emergency event alert message.

In Step 804, the EAS center sends a request message for releasing the emergency event alert (EAS Request) to the EAS AS.

In the embodiment of the present invention, the emergency event alert includes an audio-video media stream. The request message for releasing the emergency event alert sent by the EAS center contains an emergency event alert indication, indicating that an audio-video media stream needs to be received.

In Step 805, the EAS AS sends a request to receive and distribute an emergency event alert media stream (MS Request) to the EAS MS.

In Step 806, the EAS AS returns a response message of the request for releasing the emergency event alert (EAS Response) to the EAS center.

In Step 807, the EAS AS receives the emergency event alert message (EAS Message) released by the EAS center.

In Step 808, the EAS AS distributes the emergency event alert message (EAS Message) to the ECF/EFF.

In Step 809, the UE receives the emergency event alert message (EAS Message) from the ECF/EFF.

In Step 810, the EAS MS receives the released emergency event alert media stream (EAS Media) from the EAS center.

In Step 811, the EAS MS distributes the received emergency event alert media stream (EAS Media) to the ECF/EFF.

In Step 812, the UE interacts with an RACS to perform resource reservation.

Specifically, this step is as follows: after the UE receives the emergency event alert message, the UE obtains that the emergency event alert media stream in an audio-video form needs to be received according to the emergency event alert indication, requests the RACS to reserve a bearer resource, contains the priority of the applied resource, and instructs the RACS to override the bandwidth occupied by other services when bandwidth is insufficient.

In Step 813, the UE sends the IGMP Join message to the ECF/EFF.

The UE obtains a multicast address for sending the emergency event alert media stream according to the emergency event alert indication in the emergency event alert message, joins a corresponding multicast group of the emergency event alert media stream, and receives the emergency event alert in an audio-video form.

In Step 814, the UE receives the emergency event alert media stream (EAS Media) from the ECF/EFF, and plays and outputs the media stream.

Figure 9:
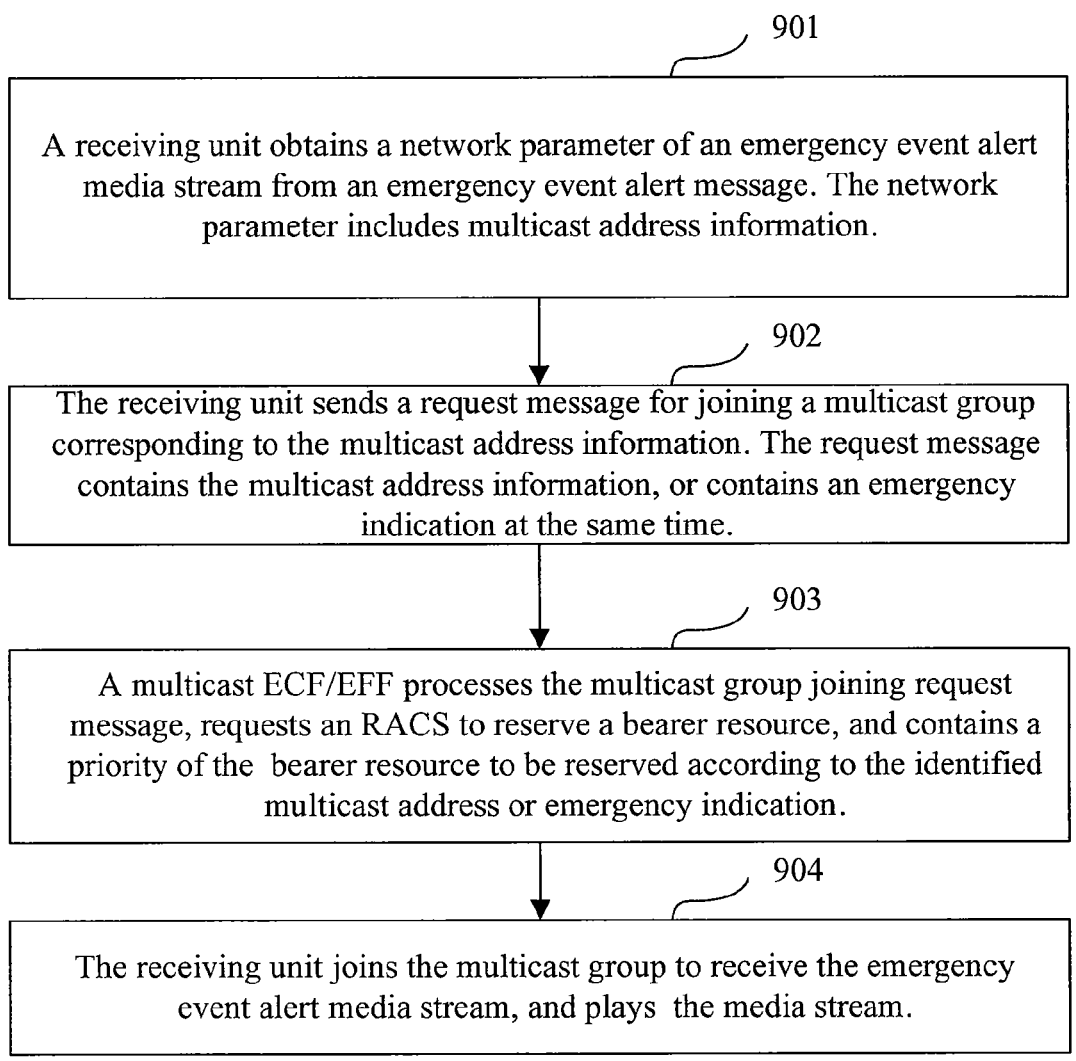
FIG. 9 is a flow chart of a method for receiving an emergency event alert media stream according to an embodiment of the present invention.

Therefore, based on the method for receiving an emergency event alert provided in the embodiment of the present invention and the specific embodiments, in an embodiment, the present invention further provides a method for receiving an emergency event alert media stream. FIG. 9 is a flow chart of a method for receiving an emergency event alert media stream according to an embodiment of the present invention. The method includes the following steps.

In Step 901, the receiving unit obtains a network parameter of an emergency event alert media stream from the emergency event alert message. The network parameter includes multicast address information. The multicast address information may be a specific dedicated multicast address, or a common multicast address.

In Step 902, the receiving unit sends a request message for joining a corresponding multicast group of the multicast address information. The request message contains the multicast address information, or contains an emergency indication at the same time.

In Step 903, a multicast ECF/EFF processes a multicast group joining request message, requests an RACS to reserve a bearer resource, and contains a priority of the bearer resource to be reserved according to the identified multicast address or emergency indication.

In Step 904, the receiving unit joins the multicast group to receive the emergency event alert media stream, and plays and outputs the media stream.

The step that the ECF/EFF requests the RACS to reserve the bearer resource is as follows:

The ECF/EFF requests the RACS to reserve the bearer resource when the ECF/EFF processes the multicast group joining request message.

Alternatively, the ECF/EFF requests the RACS to reserve the bearer resource when the ECF/EFF receives the emergency event alert message.

Alternatively, the ECF/EFF requests the RACS to reserve the bearer resource when the ECF/EFF receives the emergency event alert media stream.

Step 903 of the bandwidth policy may also be as follows.

An EAS AS requests the bearer layer to reserve the bearer resource according to the network parameter of the emergency event alert media stream after the EAS AS receives the emergency event alert message. The request contains the priority of the bearer resource to be reserved.

Alternatively, the receiving unit requests the RACS to reserve the bearer resource according to the obtained network parameter of the emergency event alert media stream. The request contains the priority of the bearer resource to be reserved.

Figure 10:
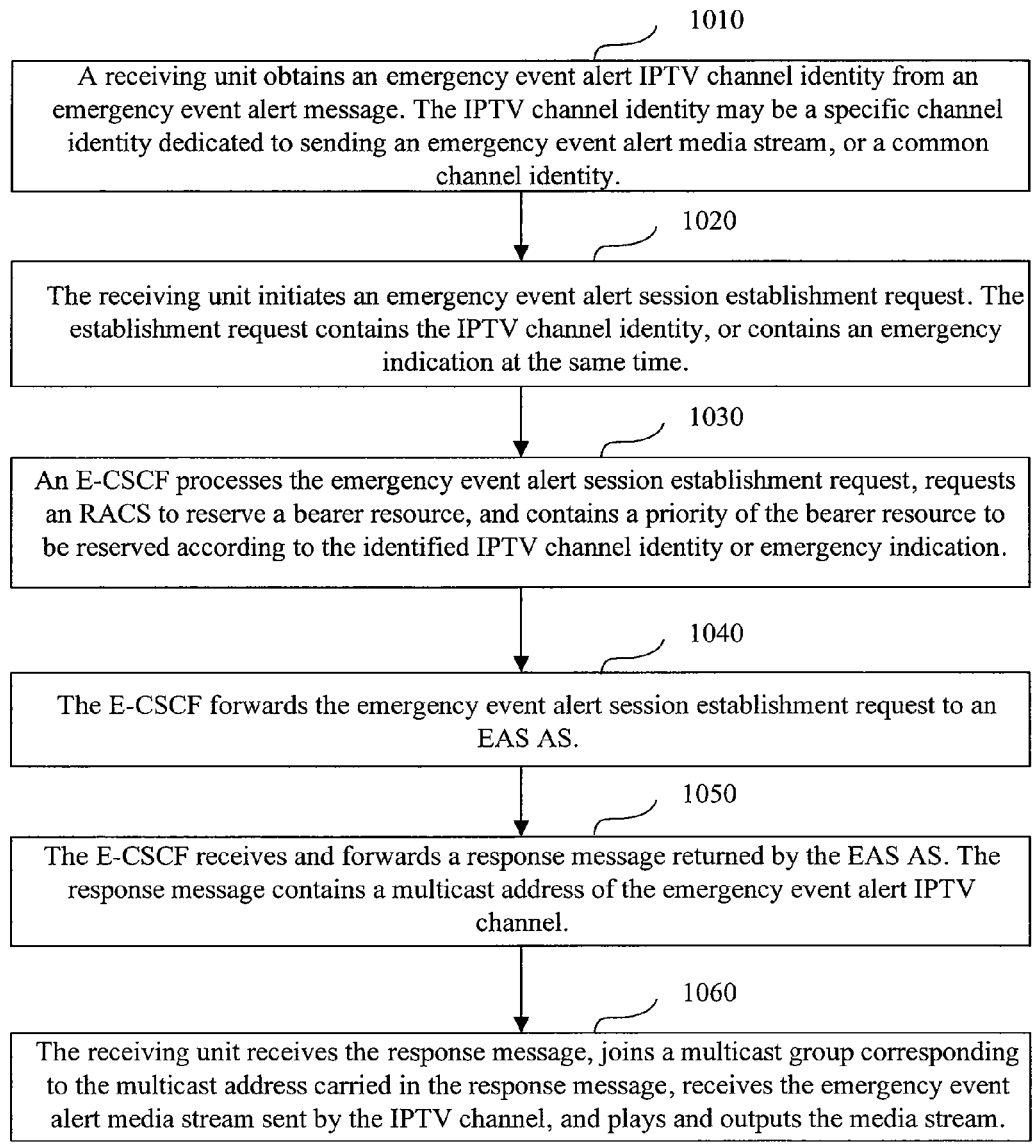
FIG. 10 is a flow chart of a method for joining an emergency event alert IPTV channel according to an embodiment of the present invention.

In an embodiment, the present invention further provides a method for joining an emergency event alert IPTV channel. FIG. 10 is a flow chart of a method for joining an emergency event alert IPTV channel according to an embodiment of the present invention. The method includes the following steps.

In Step 1010, a receiving unit obtains an emergency event alert IPTV channel identity from an emergency event alert message. The IPTV channel identity may be a specific channel identity dedicated to sending an emergency event alert media stream, or a common channel identity.

In Step 1020, the receiving unit initiates an emergency event alert session establishment request. The establishment request contains the IPTV channel identity, or contains an emergency indication at the same time.

In Step 1030, an emergency-call session control function (E-CSCF) processes the emergency event alert session establishment request, requests an RACS to reserve the bearer resource, and contains the priority of the bearer resource to be reserved according to the identified IPTV channel identity or emergency indication.

In Step 1040, the E-CSCF forwards the emergency event alert session establishment request to an EAS AS.

In Step 1050, the E-CSCF receives and forwards a response message returned by the EAS AS. The response message contains a multicast address of the emergency event alert IPTV channel.

In Step 1060, the receiving unit receives the response message of the emergency event alert session establishment request, joins a corresponding multicast group of the multicast address carried in the response message, receives the emergency event alert media stream sent by the IPTV channel, and plays and outputs the media stream.

Figure 11:
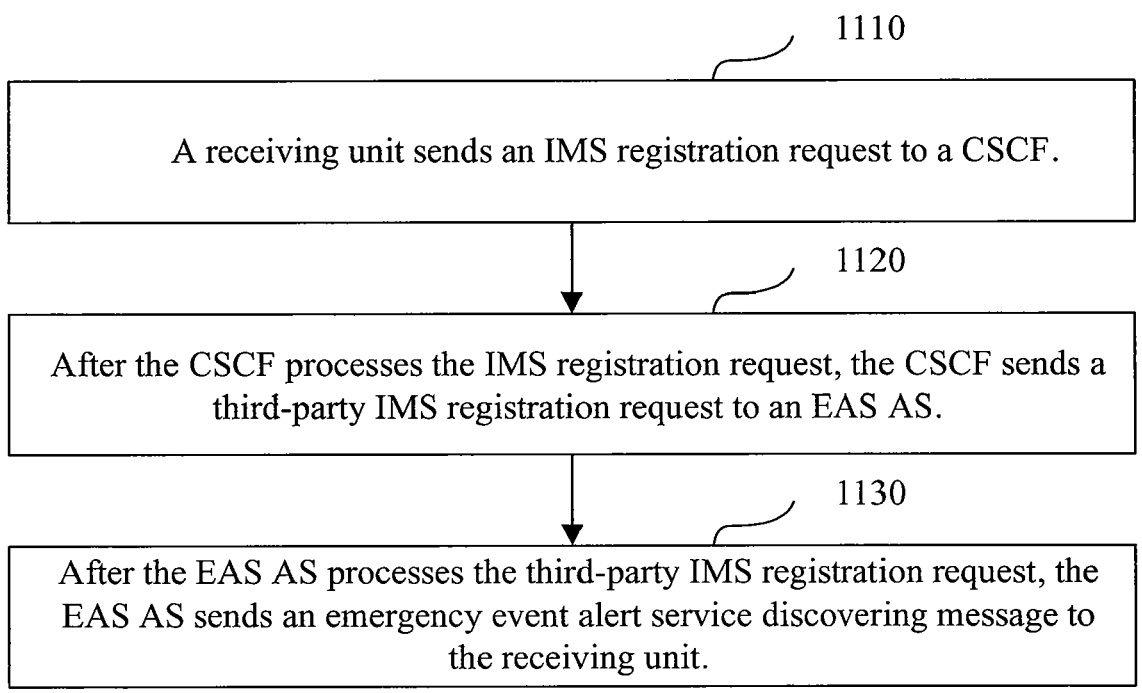
FIG. 11 is a flow chart of a method for discovering an emergency event alert service according to an embodiment of the present invention.

In an embodiment, the present invention further provides a method for discovering an emergency event alert service. FIG. 11 is a flow chart of a method for discovering an emergency event alert service according to an embodiment of the present invention. The method includes the following steps.

In Step 1110, a receiving unit sends an IMS registration request to a CSCF.

In Step 1120, after the CSCF processes the IMS registration request, the CSCF sends a third-party IMS registration request to an EAS AS.

In Step 1130, after the EAS AS processes the third-party IMS registration request, the EAS AS sends an emergency event alert service discovering message to the receiving unit.

The discovering message includes multicast address information for sending an emergency event alert message, or indirect database server address information for sending the emergency event alert message, which is configured to indicate how a receiver of the message is attached to the emergency event alert service.

In an embodiment, the present invention further provides a system for receiving an emergency event alert. Referring to FIG. 1, the system includes a distributing unit 102 and a receiving unit 103.

The distributing unit 102 is configured to send an emergency event alert message to the receiving unit 103.

The receiving unit 103 is configured to discover an emergency event alert service, attach to the emergency event alert service, and receive the emergency event alert message sent by the distributing unit 102.

The distributing unit 102 may be an entity, multiple entities, or a distribution network.

For example, the distributing unit 102 may be one of or a combination of an AS, an MS, and an ECF/EFF.

The AS is configured to receive an emergency event alert message and obtain an emergency event alert indication from the emergency event alert message, distribute the emergency event alert message, and control the MS to receive and distribute an emergency event alert media stream according to the emergency event alert indication.

The MS is configured to receive and distribute the emergency event alert media stream.

The ECF/EFF is configured to perform multicast forwarding and control in a multicast service.

The distributing unit 102 may further include an E-CSCF.

The E-CSCF is configured to identify that a session establishment request is an emergency channel joining request message by identifying that a channel identity carried in the session establishment request is an emergency channel identity, or by identifying an emergency indication carried in the session establishment request. After the E-CSCF identifies the emergency channel joining request message, the E-CSCF requests a policy enforcement entity of a bearer layer to reserve a bearer resource. The request contains a priority of the bearer resource to be reserved.

The receiving unit 103 is further configured to obtain an emergency event alert indication from the emergency event alert message, and switch to present an emergency event alert media stream according to the obtained emergency event alert indication to receive the emergency event alert media stream.

The system further includes a service discovering unit 104.

The service discovering unit 104 is configured to obtain information related to the distributing unit 102, and provide the information to the receiving unit 103.

The service discovering unit 104 may be located in a same physical entity as the receiving unit, or in a network attachment subsystem (NASS), a gateway GPRS support node (GGSN), a CSCF, an AS, or an entity processing the network attachment request.

Figure 12:
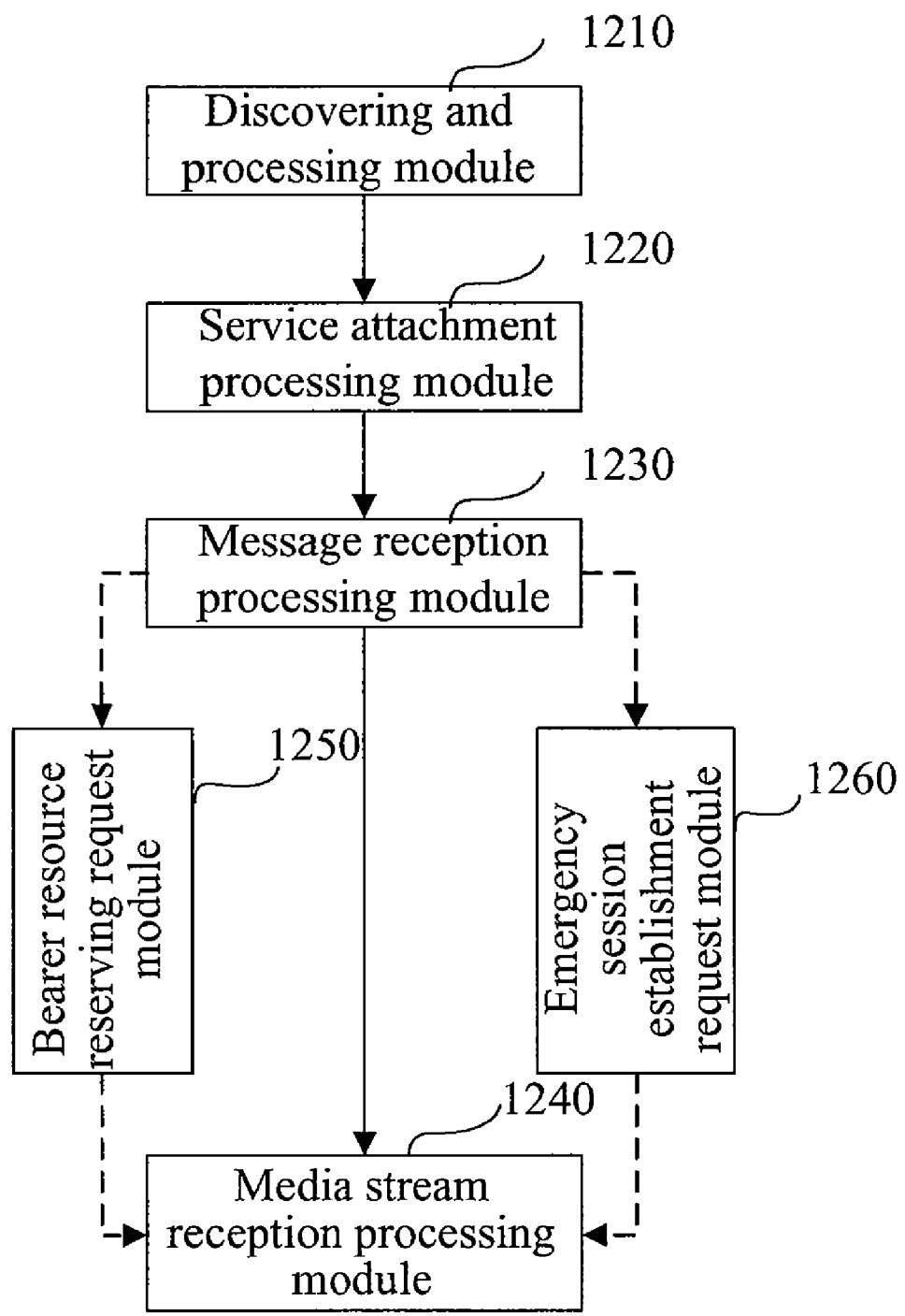
FIG. 12 is a schematic view of functional modules of an emergency event alert receiving unit device according to an embodiment of the present invention.

In an embodiment, the present invention further provides an emergency event alert receiving unit device. FIG. 12 is a block diagram of functional modules of an emergency event alert receiving unit device according to an embodiment of the present invention. The emergency event alert receiving unit device includes a discovering and processing module 1210, a service attachment processing module 1220, a message reception processing module 1230, and a media stream reception processing module 1240.

The discovering and processing module 1210 is configured to discover an emergency event alert service.

The discovering includes service discovering in a PULL manner in a process of network attachment or after the network attachment, service discovering in a PULL manner in a process of IMS registration or after the IMS registration, and service discovering in a PUSH manner after the network attachment or after the IMS registration.

The service attachment processing module 1220 is configured to perform attachment of an emergency event alert service after the emergency event alert service is found.

The message reception processing module 1230 is configured to receive an emergency event alert message, and obtain an emergency event alert indication from the emergency event alert message.

The media stream reception processing module 1240 is configured to receive an emergency event alert media stream, and switch to present the emergency event alert media stream according to the obtained emergency event alert indication.

Furthermore, the emergency event alert receiving unit device further includes one of or a combination of a bearer resource reserving request module 1250 and an emergency session establishment request module 1260.

The bearer resource reserving request module 1250 is configured to request a bearer layer to reserve a bearer resource according to the emergency event alert indication. The request contains the priority of the bearer resource to be reserved.

The emergency session establishment request module 1260 is configured to initiate an emergency event alert session establishment request. The establishment request contains an IPTV channel identity of the emergency event alert indication, or contains an emergency indication at the same time.

Figure 13:
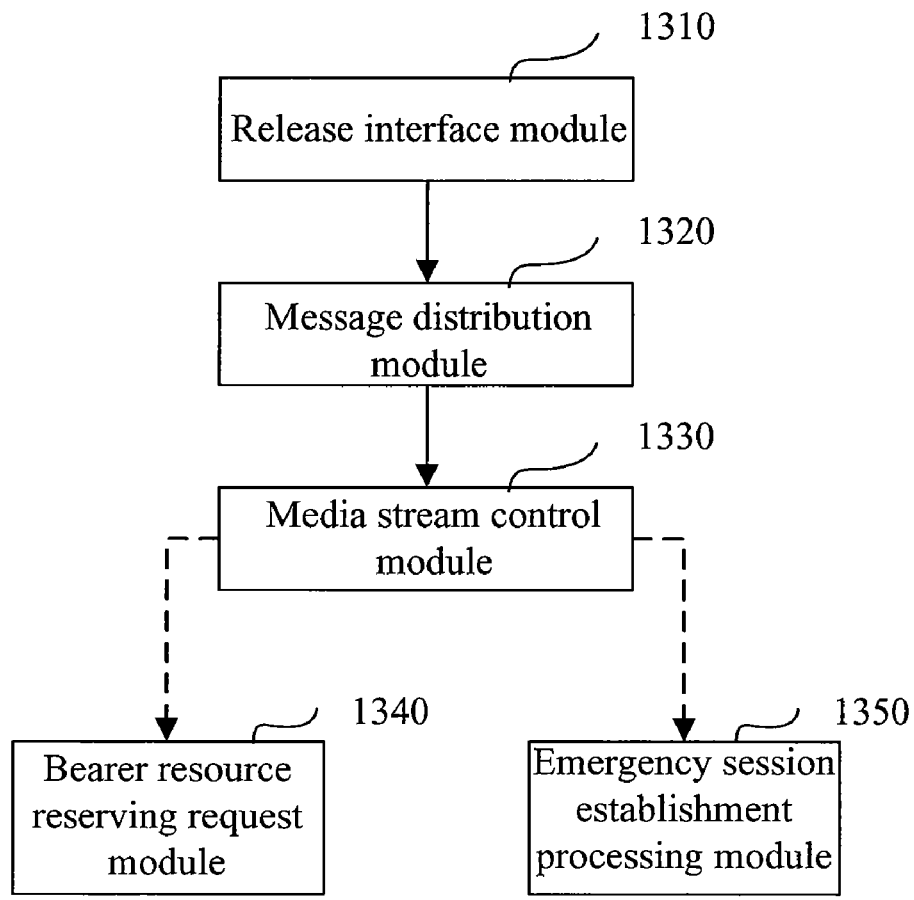
FIG. 13 is a schematic view of functional modules of an emergency event alert service server device according to an embodiment of the present invention.

In an embodiment, the present invention further provides an emergency event alert service server device. FIG. 13 is a block diagram of functional modules of an emergency event alert service server device according to an embodiment of the present invention. The emergency event alert service server device includes a release interface module 1310, a message distribution module 1320, and a media stream control module 1330.

The release interface module 1310 is configured to receive an emergency event alert message, and obtain an emergency event alert indication from the emergency event alert message.

The message distribution module 1320 is configured to distribute the emergency event alert message.

The media stream control module 1330 is configured to control a media server (MS) according to the emergency event alert indication to receive and distribute an emergency event alert media stream.

Furthermore, the emergency event alert service server device further includes one of or a combination of a bearer resource reserving request module 1340 and an emergency session establishment processing module 1350.

The bearer resource reserving request module 1340 is configured to request a bearer layer to reserve a bearer resource according to the emergency event alert indication. The request contains a priority of the bearer resource to be reserved.

The emergency session establishment processing module 1350 is configured to send a response message of the emergency event alert session establishment request. The response message contains a multicast address of an IPTV channel of the emergency event alert indication.

Figure 14:
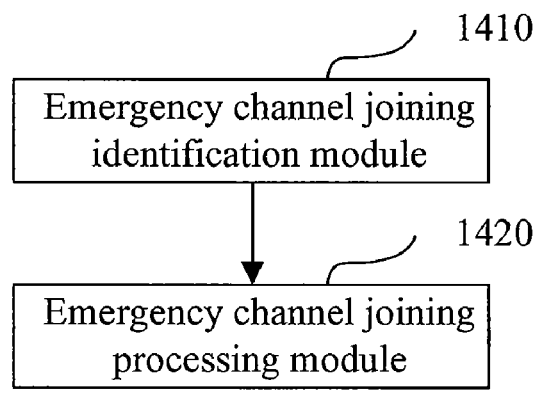
FIG. 14 is a schematic view of functional modules of an emergency-call session control function device according to an embodiment of the present invention.

In an embodiment, the present invention further provides an E-CSCF device. FIG. 14 is a block diagram of functional modules of an E-CSCF device according to an embodiment of the present invention. The E-CSCF device includes an emergency channel joining identification module 1410 and an emergency channel joining processing module 1420.

The emergency channel joining identification module 1410 is configured to identify that an emergency event alert session establishment request is an emergency channel joining request message by identifying that an IPTV channel identity carried in the emergency event alert session establishment request is an emergency channel identity, or by identifying an emergency indication carried in the session establishment request.

The emergency channel joining processing module 1420 is configured to request a policy enforcement entity of a bearer layer to reserve a bearer resource after identifying the emergency channel joining request message, and contain a priority of the bearer resource to be reserved according to the identified IPTV channel identity or an emergency indication.

Furthermore, the emergency channel joining processing module 1420 is further configured to forward the emergency event alert session establishment request to an EAS AS after identifying the emergency channel joining request message, and receive and forward a response message returned by the EAS AS. The response message contains a multicast address that the emergency channel joins.

Through the above description of the embodiments, it is apparent to those skilled in the art that the present invention may be implemented through software on a necessary universal hardware platform, and definitely may also be implemented through hardware, while in most cases the former one is preferred. Based on the understanding, the technical solutions in the embodiments of the present invention or the part that makes contributions to the prior art can be substantially embodied in the form of a software product. The software product may be stored in a storage media, and contain several instructions to instruct a computer product (for example, an IPTV television, a mobile phone, a personal computer, a media player, and the like) to perform the method described in the embodiments of the present invention. For example, the storage media is a ROM/RAM, a magnetic disk, and an optical disk.

Finally, it should be understood that the above embodiments are only used to illustrate, but not to limit the technical solution of the present disclosure. In despite of the detailed description of the present disclosure with reference to above exemplary embodiments, it should be understood that various modifications, changes or equivalent replacements can be made by those skilled in the art without departing from the spirit and scope of the present disclosure and covered in the claims of the present disclosure.

What is claimed is:

1. A method for receiving an emergency event alert, comprising:
   discovering, by a receiving unit, an emergency event alert service;
   attaching, by the receiving unit, to the emergency event alert service; and
   receiving, by the receiving unit, an emergency event alert message sent by a distributing unit;
   wherein if multicast address information for the distributing unit to send the emergency event alert is obtained by the receiving unit, attaching to the emergency event alert service comprises: sending, by the receiving unit to the distributing unit, a request message for joining a corresponding multicast group; and joining the corresponding multicast group to complete attachment of the emergency event alert service.

2. The method according to claim 1, wherein a manner of the receiving unit discovering the emergency event alert service comprises:
   presetting information related to the distributing unit in the receiving unit; or
   performing message exchange between the receiving unit and a service discovering unit to obtain information related to the distributing unit;
   wherein the information related to the distributing unit comprises multicast address information for the distributing unit to send the emergency event alert, or indirect database server address information of the distributing unit.

3. The method according to claim 2, wherein a manner of performing message exchange between the receiving unit and the service discovering unit to obtain the information related to the distributing unit comprises any one of the following:
   sending, by the receiving unit, a network attachment request to a network in a broadcast manner; and receiving, by an entity processing the network attachment request in the network, the network attachment request, and sending a network attachment response message containing the information related to the distributing unit to the receiving unit; wherein the service discovering unit is located in the entity processing the network attachment request in the network;
   sending, by the receiving unit, an emergency event alert service discovering request to the network in a broadcast manner after completing network attachment; and receiving, by the service discovering unit, the service discovering request, and sending an emergency event alert service discovering response message containing the information related to the distributing unit to the receiving unit;
   sending, by the service discovering unit, the information related to the distributing unit to the receiving unit actively after perceiving that the receiving unit completes network attachment;
   sending, by the receiving unit, an IP multimedia subsystem (IMS) registration request to a call session control function (CSCF); and receiving, by an entity processing the IMS registration request in an IMS network, the IMS registration request, and sending an IMS registration response message containing the information related to the distributing unit to the receiving unit; wherein the service discovering unit is located in the CSCF;
   sending, by the receiving unit, an emergency event alert service discovering request to a CSCF after completing IMS registration; triggering, by the CSCF, the request to the service discovering unit; processing, by the service discovering unit, the service discovering request; and sending, by the service discovering unit, an emergency event alert service discovering response message containing the information related to the distributing unit in to the CSCF; and sending the emergency event alert service discovering response message to the receiving unit through the CSCF; and
   sending, by the receiving unit, an IMS registration request to a CSCF; sending, by the CSCF, a third-party IMS registration request to an emergency alert system application server (EAS AS) after processing the IMS registration request; and sending, by the EAS AS, the information related to the distributing unit to the receiving unit actively after processing the third-party IMS registration request; wherein the CSCF and the EAS AS are service discovering units.

4. The method according to claim 1, wherein the emergency event alert message sent by the distributing unit and received by the receiving unit contains an emergency event alert indication, and the method further comprises:
   processing and presenting, by the receiving unit, the emergency event alert according to the emergency event alert indication in the emergency event alert message.

5. The method according to claim 4, wherein the emergency event alert indication comprises types of the emergency event alert, an emergency indication, and a parameter of an interface for transmitting an emergency event alert media stream; and the parameter of the interface for transmitting the emergency event alert media stream is any one of the followings: multicast address information, broadcast address information, file transfer protocol/hypertext transfer protocol (FTP/HTTP) application layer address information and Internet protocol television (IPTV) channel identity information.

6. The method according to claim 5, wherein before the processing and presenting, by the receiving unit, the emergency event alert according to the emergency event alert indication in the emergency event alert message, the method further comprises any one of the followings:

requesting, by the distributing unit, a bearer layer to reserve a bearer resource and indicating a priority of the resource during distribution of the emergency event alert according to the emergency event alert indication;

when the distributing unit receives a request for content of the emergency event alert media stream sent by the receiving unit, requesting, by the distributing unit, a bearer layer to reserve a bearer resource, and indicating a priority of the resource by identifying the request for content of the emergency event alert media stream as the emergency event alert indication;

requesting, by the receiving unit, a policy enforcement entity of a bearer layer to reserve a bearer resource and indicating a priority of the resource according to the emergency event alert indication after receiving the emergency event alert message;

initiating, by the receiving unit, an emergency event alert session establishment request according to the emergency event alert indication after receiving the emergency event alert message, and requesting, by the distributing unit, a policy enforcement entity of a bearer layer through establishment of the emergency event alert session to reserve the bearer resource and indicate a priority of the resource; and presetting bandwidth requirements and a priority of the emergency event alert media stream in the policy enforcement entity or a policy decision entity of a bearer layer, and instructing the bearer layer to execute a preset bandwidth policy automatically after detecting the emergency event alert media stream.

7. The method according to claim 6, wherein if the parameter of the interface for transmitting the emergency event alert media stream is the multicast address information, processing and presenting, by the receiving unit, the emergency event alert according to the emergency event alert indication in the emergency event alert message comprises:

obtaining, by the receiving unit, the multicast address information;

sending, by the receiving unit, the request message for joining the multicast group corresponding to the multicast address information, wherein the request message contains the multicast address information, or contains the emergency indication at the same time; and joining, by the receiving unit, the multicast group, and receiving the emergency event alert media stream, and playing the media stream.

8. The method according to claim 5, wherein the parameter of the interface for transmitting the emergency event alert media stream is IPTV channel identity information, the method further comprises:

obtaining an IPTV channel identity of an emergency event alert from the emergency event alert message, wherein the IPTV channel identity is a specific channel identity dedicated to sending an emergency event alert media stream or a common channel identity;

initiating an emergency event alert session establishment request, wherein the establishment request contains the IPTV channel identity, or contains an emergency indication at the same time;

processing, by an emergency-call session control function (E-CSCF), the emergency event alert session establishment request, requesting a resource and admission control subsystem (RACS) to reserve a bearer resource, and containing a priority of the bearer resource to be reserved according to the identified IPTV channel identity or the emergency indication; and after the emergency event alert session is established, joining the emergency event alert IPTV channel.

9. The method according to claim 8, further comprising:

forwarding, by the E-CSCF, the emergency event alert session establishment request to an EAS AS;

receiving and forwarding, by the E-CSCF, a response message returned by the EAS AS, wherein the response message contains a multicast address of the emergency event alert IPTV channel; and receiving a response message of the emergency event alert session establishment request, joining a multicast group corresponding to the multicast address carried in the response message, receiving the emergency event alert media stream sent by the IPTV channel, and playing the media stream.

10. An emergency event alert receiving unit device, comprising:

a discovering and processing module, configured to discover an emergency event alert service;

a service attachment processing module, configured to attach to the emergency event alert service after the emergency event alert service discovering is completed; and a message reception processing module, configured to receive an emergency event alert message and obtain an emergency event alert indication from the emergency event alert message wherein if multicast address information for the distributing unit to send the emergency event alert is obtained by the receiving unit, the receiving unit attaches to the emergency event alert service by: sending, by the receiving unit, to the distributing unit a request message for joining a corresponding multicast group, and joining the corresponding multicast group to complete attachment of the emergency event alert service.

11. The emergency event alert receiving unit device according to claim 10, further comprising:

a media stream reception processing module, configured to receive an emergency event alert media stream and switch to present the emergency event alert media stream according to the obtained emergency event alert indication.

12. The emergency event alert receiving unit device according to claim 11, further comprising one of or a combination of the following:

a bearer resource reserving request module, configured to request a bearer layer to reserve a bearer resource according to the emergency event alert indication, wherein the request contains a priority of the bearer resource to be reserved; and an emergency session establishment request module, configured to initiate an emergency event alert session establishment request, wherein the establishment request contains an Internet protocol television (IPTV) channel identity of the emergency event alert indication, or contains an emergency indication at the same time.

13. An emergency-call session control function (E-CSCF) device, comprising:

an emergency channel joining identification module, configured to identify that an emergency event alert session establishment request is an emergency channel joining request message by identifying that an Internet protocol television (IPTV) channel identity carried in the emergency event alert session establishment request is an emergency channel identity, or by identifying an emergency indication message carried in the session establishment request; and an emergency channel joining processing module, configured to request a policy enforcement entity of a bearer layer to reserve a bearer resource after the emergency channel joining request message is identified, and contain a priority of the bearer resource to be reserved according to the identified IPTV channel identity or the emergency indication.

14. The E-CSCF device according to claim 13, wherein the emergency channel joining processing module is further configured to forw and the emergency event alert session establishment request to an emergency alert system application server (EAS AS) after the emergency channel joining request message is identified, and receive and forward a response message returned by the EAS AS, wherein the response message contains a multicast address joined by the emergency channel.

15. A method for receiving an emergency event alert, comprising:
discovering, by a receiving unit, an emergency event alert service;
attaching, by the receiving unit, to the emergency event alert service; and
receiving, by the receiving unit, an emergency event alert message sent by a distributing unit;
wherein if indirect database server address information of the distributing unit is obtained by the receiving unit, attaching to the emergency event alert service comprises: sending, by the receiving unit, a query message to the server to obtain a multicast address for the distributing unit to send the emergency event alert message, sending a request message for joining the corresponding multicast group to the distributing unit, and joining the corresponding multicast group to complete attachment of the emergency event alert service.

16. An emergency event alert receiving unit device, comprising:
a discovering and processing module, configured to discover an emergency event alert service;
a service attachment processing module, configured to attach to the emergency event alert service after the emergency event alert service discovering is completed; and
a message reception processing module, configured to receive an emergency event alert message and obtain an emergency event alert indication from the emergency event alert message;
wherein if indirect database server address information of the distributing unit is obtained by the receiving unit, the receiving unit attaches to the emergency event alert service by: sending, by the receiving unit, a query message to the server to obtain a multicast address for the distributing unit to send the emergency event alert message, sending a request message for joining the corresponding multicast group to the distributing unit, and joining the corresponding multicast group to complete attachment of the emergency event alert service.

* * * * *

UNITED STATES PATENT AND TRADEMARK OFFICE
CERTIFICATE OF CORRECTION

PATENT NO. : 8,184,002 B2  
APPLICATION NO. : 12/502320  
DATED : May 22, 2012  
INVENTOR(S) : Dewen Zhang et al.

Page 1 of 1

It is certified that error appears in the above-identified patent and that said Letters Patent is hereby corrected as shown below:

In the Claims

In column 35, claim 14, line 17, after "configured to" replace "forw and" with --forward--.

Signed and Sealed this  
Seventh Day of August, 2012

David J. Kappos  
*Director of the United States Patent and Trademark Office*